US012769109B2

(12) United States Patent
Yamane

(10) Patent No.: US 12,769,109 B2
(45) Date of Patent: Oct. 20, 2026

(54) IMAGE CAPTURING DEVICE AND IMAGE GENERATION METHOD

(71) Applicant: Kioxia Corporation, Tokyo (JP)

(72) Inventor: Takeshi Yamane, Tsukuba Ibaraki (JP)

(73) Assignee: KIOXIA CORPORATION, Tokyo (JP)

( * ) Notice: Subject to any disclaimer, the term of this patent is extended or adjusted under 35 U.S.C. 154(b) by 36 days.

(21) Appl. No.: 19/065,130

(22) Filed: Feb. 27, 2025

(65) Prior Publication Data

US 2025/0298235 A1 Sep. 25, 2025

(30) Foreign Application Priority Data

Mar. 19, 2024 (JP) ................................ 2024-043700

(51) Int. Cl.
*G02B 21/36* (2006.01)
*G02B 21/06* (2006.01)
*G21K 7/00* (2006.01)

(52) U.S. Cl.
CPC ........... *G02B 21/365* (2013.01); *G02B 21/06* (2013.01); *G21K 7/00* (2013.01)

(58) Field of Classification Search
CPC ......... G02B 21/365; G02B 21/06; G21K 7/00
USPC ............................................................ 348/79
See application file for complete search history.

(56) References Cited

U.S. PATENT DOCUMENTS

2009/0084953 A1* 4/2009 Harada ................ G01N 23/225 250/307
2017/0210072 A1* 7/2017 Rodriguez ............... G02B 1/10
2017/0352144 A1* 12/2017 Yu ............................. G03F 1/72
2018/0261352 A1 9/2018 Matsuyama et al.
2020/0033488 A1 1/2020 Yamane
2022/0069191 A1 3/2022 Yamane
2022/0392793 A1* 12/2022 Buxbaum ............. H01J 37/265
2024/0045325 A1* 2/2024 Harayama ............. G03F 7/0002
2024/0096515 A1 3/2024 Yamane
2025/0045907 A1* 2/2025 Froehlich .............. G06T 7/0008
2025/0045911 A1* 2/2025 Freytag .................... G06T 7/001
2025/0061563 A1* 2/2025 Barz ........................ G06T 7/001
2025/0239429 A1* 7/2025 Zeidler ................. H01J 37/153
2025/0298235 A1* 9/2025 Yamane ................. G02B 21/06
2025/0336059 A1* 10/2025 Alperovich ............. G06T 7/001

FOREIGN PATENT DOCUMENTS

JP 2008-544217 A 12/2008
JP 5846574 B2 1/2016
JP 6478433 B2 3/2019
JP 2020-016543 A 1/2020
JP 7062547 B2 5/2022
JP 2024-043971 A 4/2024

* cited by examiner

*Primary Examiner* — Tung T Vo
(74) *Attorney, Agent, or Firm* — Foley & Lardner LLP

(57) ABSTRACT

An image capturing device includes a stage holding a subject; a detector including a first pixel layer, a second pixel layer, and a third pixel layer stacked on top of one another, with an insulating film interposed adjacent ones of the first to third pixel layers; an image formation optical member configured to form, on the detector, an image based on imaging light transmitted through the subject; and an image processor configured to reconstruct an image of the subject based on a detection intensity of the imaging light detected by the detector.

9 Claims, 31 Drawing Sheets

IMAGE CAPTURING DEVICE AND IMAGE GENERATION METHOD

CROSS-REFERENCE TO RELATED APPLICATION

This application is based upon and claims the benefit of priority from Japanese Patent Application No. 2024-043700, filed Mar. 19, 2024, the entire contents of which are incorporated herein by reference.

FIELD

Embodiments described herein relate generally to an image capturing device and an image generation method.

BACKGROUND

A transmission X-ray microscope has sometimes been configured for observing the structure of a subject with high resolution and nondestructively.

DETAILED DESCRIPTION

Figure 1:
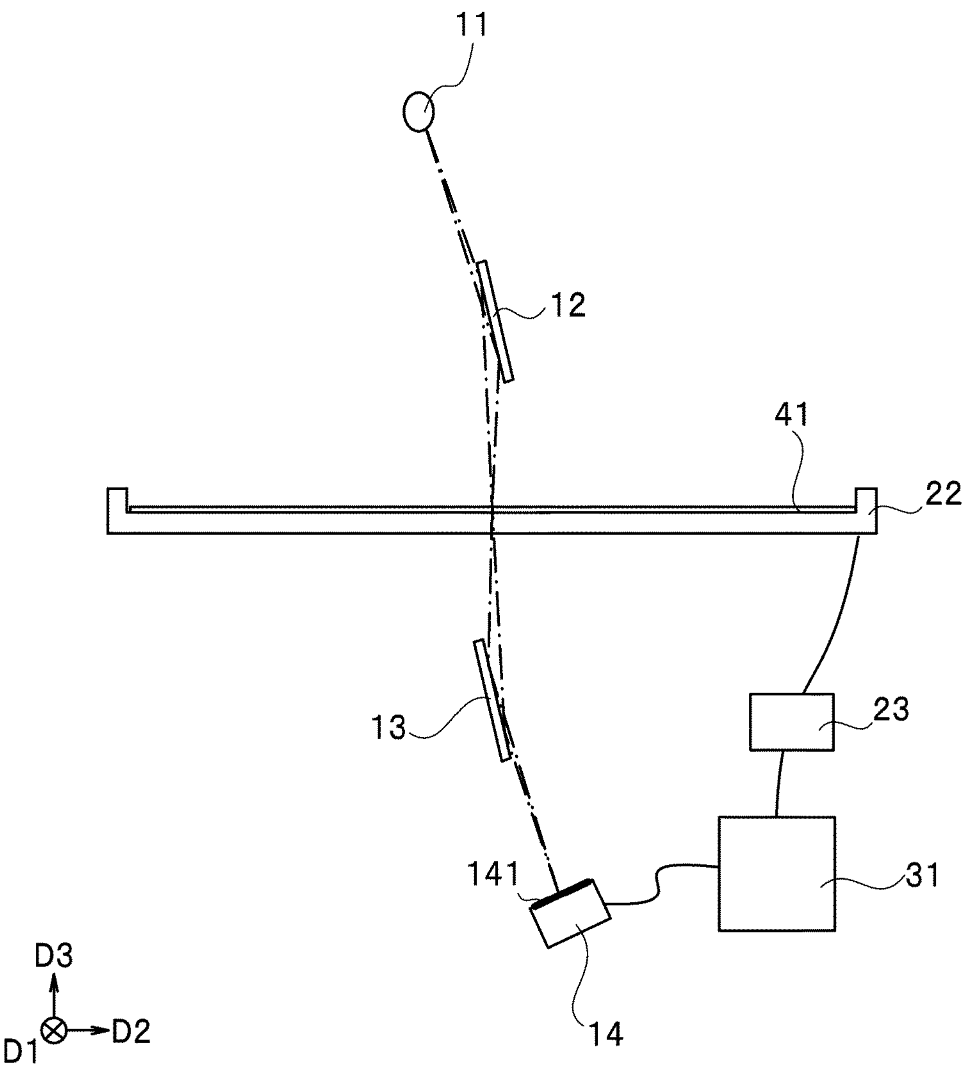
FIG. 1 is a schematic view illustrating an example of a configuration of an image capturing device according to a first embodiment.

Embodiments provide an image capturing device and an image generation method capable of acquiring a reconstructed image with high accuracy while simplifying manufacturing of a device.

In general, according to one embodiment, an image capturing device includes a stage holding a subject; a detector including a first pixel layer, a second pixel layer, and a third pixel layer stacked on top of one another, with an insulating film interposed adjacent ones of the first to third pixel layers; an image formation optical member configured to form, on the detector, an image based on imaging light transmitted through the subject; and an image processor configured to reconstruct an image of the subject based on a detection intensity of the imaging light detected by the detector. The first pixel layer includes a plurality of first line-shaped pixels with line-shaped light receiving surfaces extending in a first direction, and the plurality of first line-shaped pixels are arranged with equal intervals in a plane parallel to the first pixel layer. The second pixel layer includes a plurality of second line-shaped pixels with line-shaped light receiving surfaces extending in a second direction, and the plurality of second line-shaped pixels are arranged with equal intervals in a plane parallel to the second pixel layer. The third pixel layer includes a plurality of third line-shaped pixels with line-shaped light receiving surfaces extending in a third direction, and the plurality of third line-shaped pixels are arranged with equal intervals in a plane parallel to the third pixel layer. The first direction, the second direction, and the third direction are different from one another. The detector is configured to output a first detection intensity profile detected by the first pixel layer, a second detection intensity profile detected by the second pixel layer, and a third detection intensity profile detected by the third pixel layer. The image processor is further configured to: extract one or more first deformed portions from the first detection intensity profile, extract one or more second deformed portions from the second detection intensity profile, and extract one or more third deformed portions from the third detection intensity profile; create one or more deformed portion sets including at least one of the first deformed portions, at least one of the second deformed portions, and at least one of the third deformed portions; reconstruct a small area image based on the first to third deformed portions in each of the deformed portion sets; and generate the image of the subject by superimposing the reconstructed small area images.

Hereinafter, embodiments will be described with reference to the accompanying drawings.

First Embodiment

The image capturing device according to the embodiment is, for example, a transmission X-ray microscope. The transmission X-ray microscope is an image formation optical system using electromagnetic waves with short wavelengths, and has a high resolution of about several tens of nanometers. In addition, since X-rays have a high transmittance, it is possible to observe the surface structure and internal structure of a relatively thick subject such as a silicon wafer having a surface formed with a semiconductor device or the like.

FIG. 1 is a schematic view illustrating an example of a configuration of an image capturing device in a first embodiment. The image capturing device includes a light source 11, an illumination mirror 12, an image formation mirror 13, and an image detector 14. In addition, the image capturing device also includes a stage 22, a stage drive unit 23, and a control analysis unit 31. The light source 11 is an X-ray source that irradiates a target made of molybdenum or the like as materials with an electron beam to generate X-rays. The illumination mirror 12 is used to collect the X-rays emitted from the light source 11 toward the subject 41 placed on the stage 22. The illumination mirror 12 is, for example, a Montel mirror.

Figure 2:
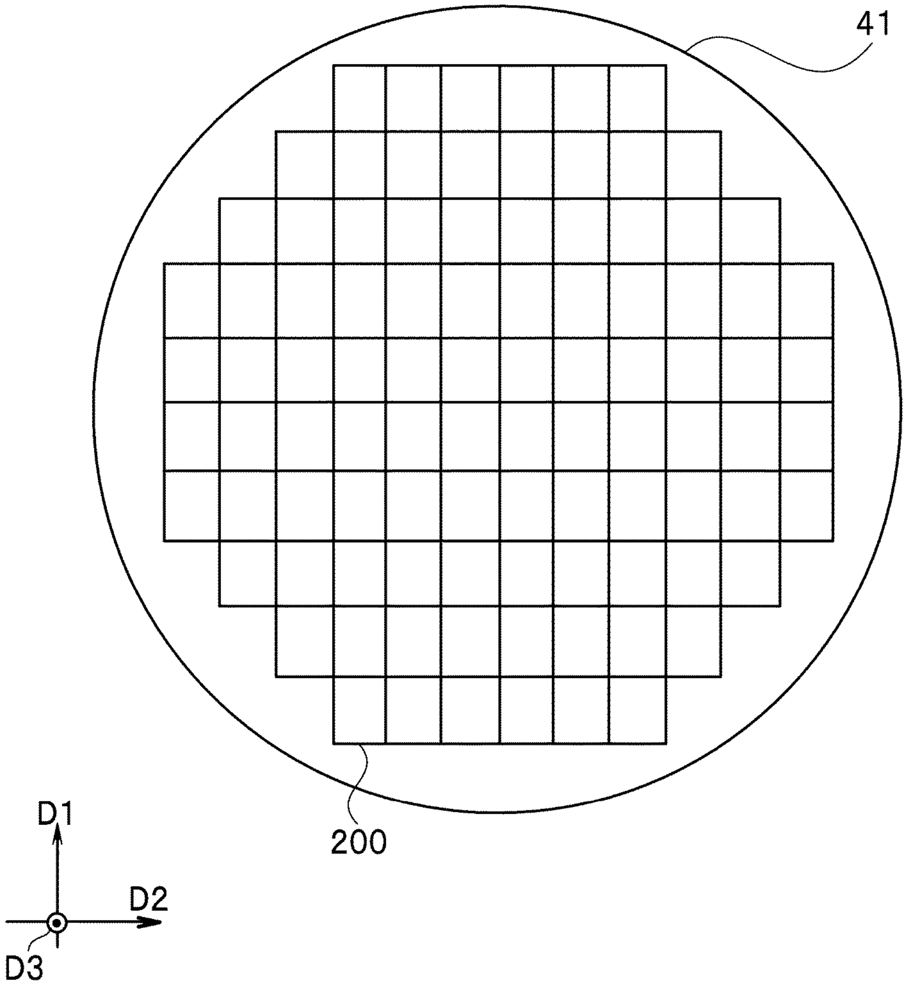
FIG. 2 is a schematic view illustrating an example of a subject.

The subject 41 is, for example, a silicon wafer on which semiconductor devices are formed. FIG. 2 is a schematic view illustrating an example of the subject. The silicon wafer 41, which is a subject, has a plurality of memory chip corresponding areas 200 arranged in a matrix in a D1 direction and a D2 direction orthogonal to the D1 direction. The silicon wafer 41 is divided into a plurality of memory chips by dicing (die cutting) the silicon wafer 41 at the boundaries of the memory chip corresponding areas 200. Various processes are repeated on the silicon wafer 41, such as depositing various films by CVD technology, implanting impurities into various films by ion implantation technology, and patterning the deposited films by lithography technology and etching technology. As a result, a non-volatile memory is formed in each of the plurality of memory chip corresponding areas 200.

Figure 3:
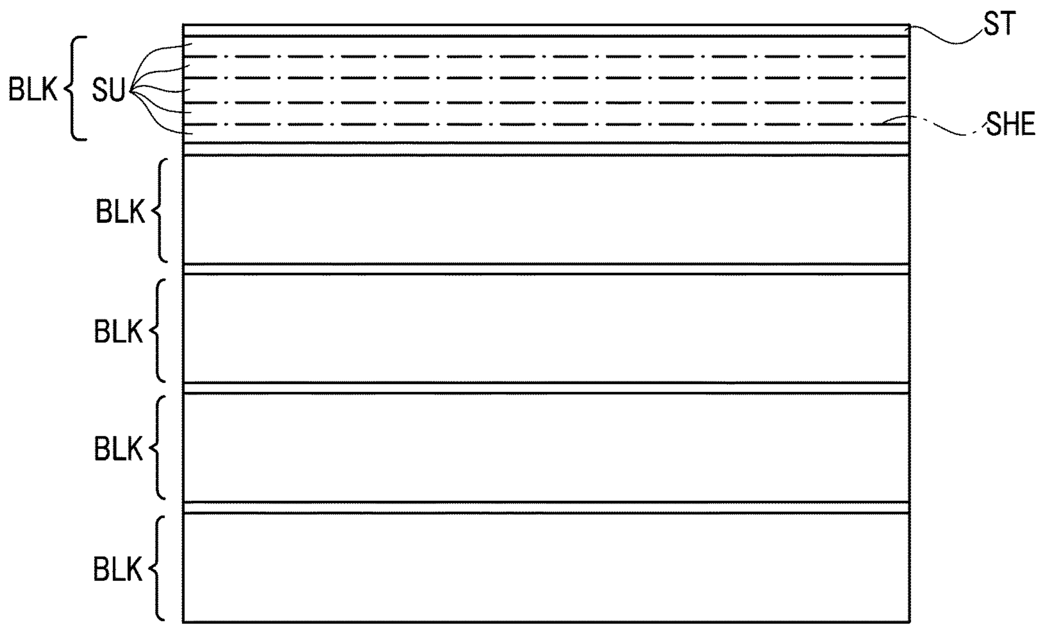
FIG. 3 is a plan view illustrating an example of a memory cell array formed in a memory chip corresponding area.

The memory chip corresponding area 200 includes, for example, a memory cell array and peripheral circuits. FIG. 3 is a plan view illustrating an example of a memory cell array formed in the memory chip corresponding area 200. FIG. 3 illustrates an enlarged view of a partial area of the memory cell array. Each block BLK provided in the memory cell array is formed as a band-shaped area having a predetermined width in the D2 direction with the D2 direction as a longitudinal direction. A slit ST is formed between each block BLK. The slit ST is filled with an insulating material to electrically separate adjacent blocks BLK from each other. Each block BLK includes a plurality of string units SU. The string unit SU is formed as a band-shaped area obtained by dividing the X direction side of the block BLK. A slit SHE is formed between each string unit SU. In this manner, the memory cell array has a periodic structure in units of blocks BLK.

Figure 4:
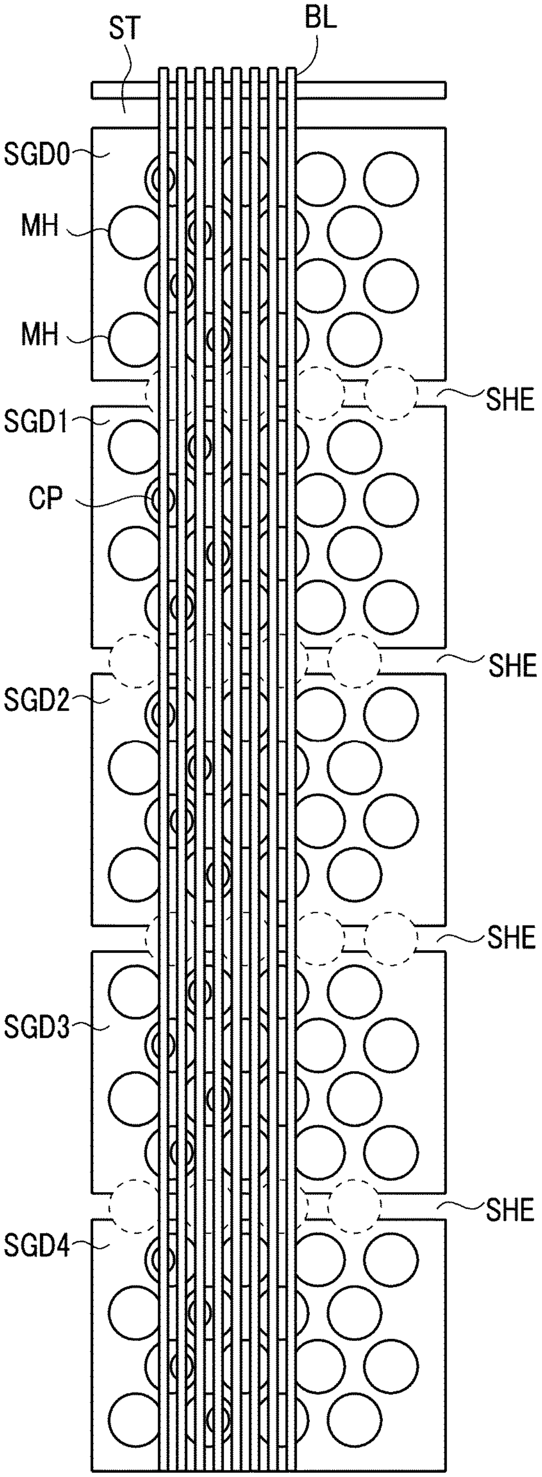
FIG. 4 is a plan view illustrating an example of a detailed structure of the memory cell array.

FIG. 4 is a plan view illustrating an example of the detailed structure of the memory cell array. FIG. 4 illustrates the structure of one block BLK, and illustrates an example in which five string units SU0 to SU4 each including five select gate lines SGD0 to SGD4 separated from each other by the slit SHE are configured in one block BLK. The slit SHE is filled with an insulating material, and the select gate lines SGD between adjacent string units SU are electrically separated from each other. Each string unit SU includes a plurality of NAND strings. Each NAND string is formed in a columnar memory hole MH extending in the Z direction. A plurality of memory holes MH constituting a NAND string NS are disposed in one string unit SU. The number of NAND strings (memory holes) in one string unit is extremely large, and the memory holes MH are arranged in a staggered arrangement in order to reduce the chip size. Each memory hole MH in one string unit SU is connected to a bit line BL by a contact plug CP. Each bit line BL is connected to one memory hole MH for each string unit SU via the contact plug CP. In order to connect each bit line BL to one memory hole MH of each string, the position of the contact plug CP is shifted in the direction orthogonal to the extending direction of the bit line BL. The image capturing device according to the embodiment is used, for example, to observe the internal structure of an area in which memory holes MH as illustrated in FIG. 4 are formed.

In the present embodiment, the silicon wafer 41 is placed on the stage 22, the stage 22 is moved to a desired position, and an image is acquired by the image detector 14.

Figure 5:
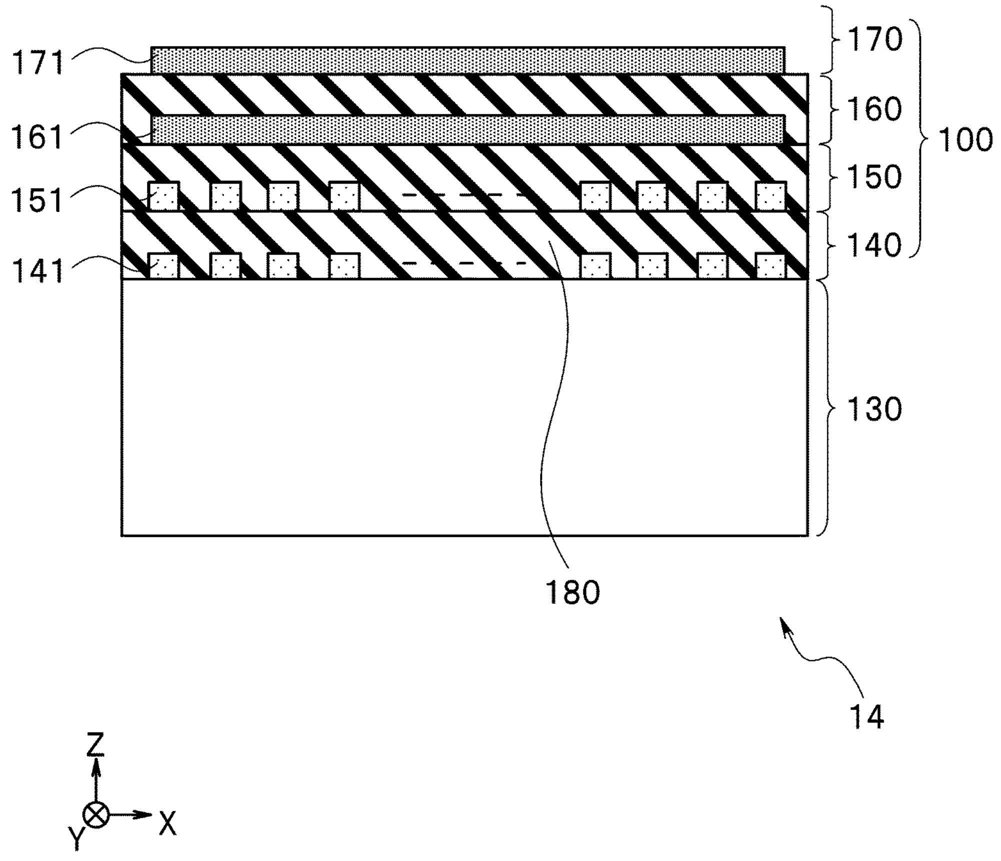
FIG. 5 is a view illustrating an example of a cross section of an image detector according to the first embodiment.

Referring again to FIG. 1, the detailed configuration of the image capturing device according to the embodiment will be described. FIG. 5 is a view illustrating an example of a cross section of the image detector 14 according to the first embodiment. The image formation mirror 13 as an image formation optical member collects the X-rays that transmitted through the subject 41, and forms an image of the subject 41 on a detection body 100 of the image detector 14. The image of the subject 41 disposed parallel to a D1-D2 plane is formed on an X-Y plane of the detection body 100. In addition, the optical axis of the X-ray is incident on the subject 41 along the D3 direction and is incident on the detection body 100 of the image detector 14 along the Z direction. The D3 direction is a direction perpendicular to the D1-D2 plane. That is, the X direction of the detection body 100 corresponds to the D1 direction of the subject 41, the Y direction of the detection body 100 corresponds to the D2 direction of the subject 41, and the Z direction of the detection body 100 corresponds to the D3 direction of the subject 41.

As illustrated in FIG. 5, in the present embodiment, the image detector 14 includes a substrate 130 and a detection body 100 having four pixel layers (a first pixel layer 140, a second pixel layer 150, a third pixel layer 160, and a fourth pixel layer 170). The first pixel layer 140 is formed on the substrate 130 made of silicon or the like. The first pixel layer 140 includes a plurality of first line-shaped pixels 141. The surface of each of the first line-shaped pixels 141 is covered with an insulating film 180 formed of a silicon oxide film or the like. The second pixel layer 150 is formed above the first pixel layer 140. The second pixel layer 150 includes a plurality of second line-shaped pixels 151. The surface of each of the second line-shaped pixels 151 is covered with the insulating film 180.

The third pixel layer 160 is formed above the second pixel layer 150. The third pixel layer 160 includes a plurality of third line-shaped pixels 161. The surface of each of the third line-shaped pixels 161 is covered with the insulating film 180. The fourth pixel layer 170 is formed above the third pixel layer 160. The fourth pixel layer 170 includes a plurality of fourth line-shaped pixels 171.

Figure 6A:
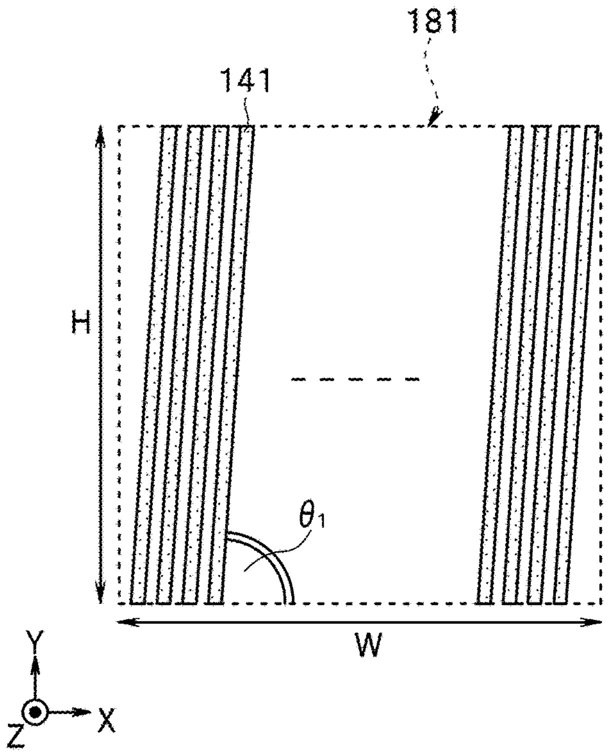
FIG. 6A is a plan view of a first pixel layer as viewed from above in a Z direction.
Figure 6B:
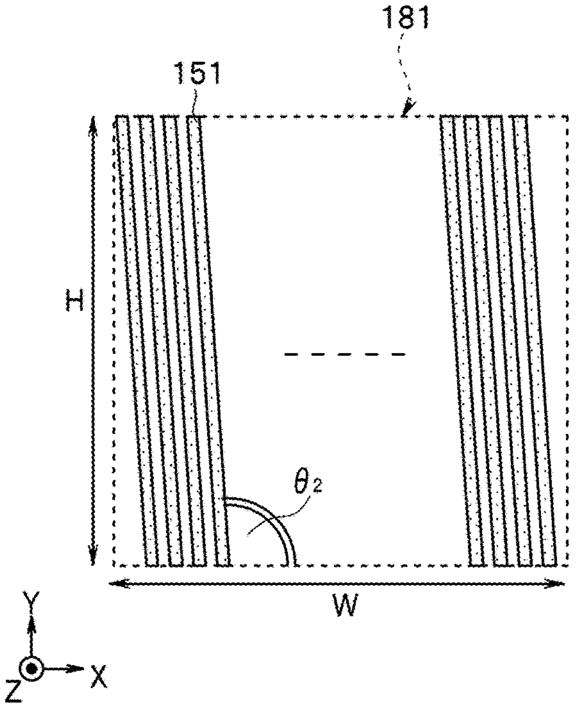
FIG. 6B is a plan view of a second pixel layer as viewed from above in the Z direction.
Figure 6C:
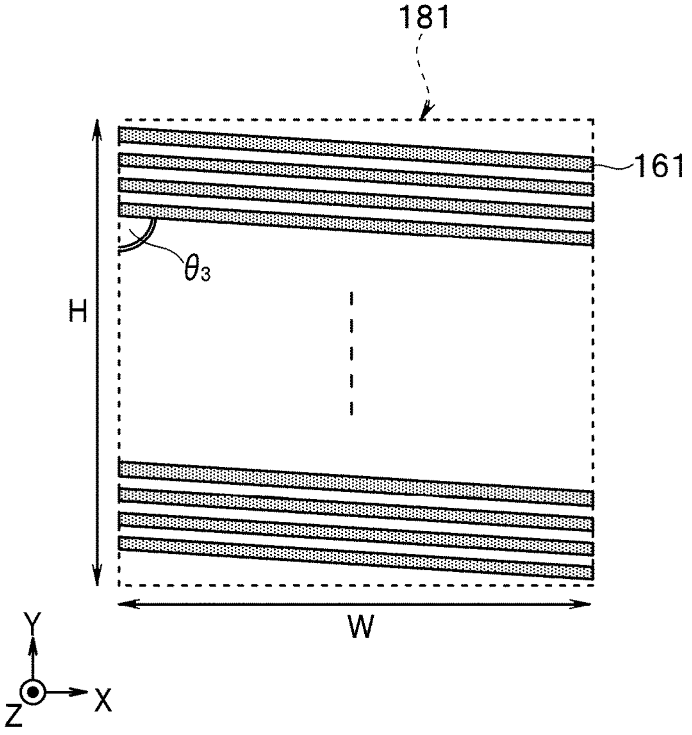
FIG. 6C is a plan view of a third pixel layer as viewed from above in the Z direction.
Figure 6D:
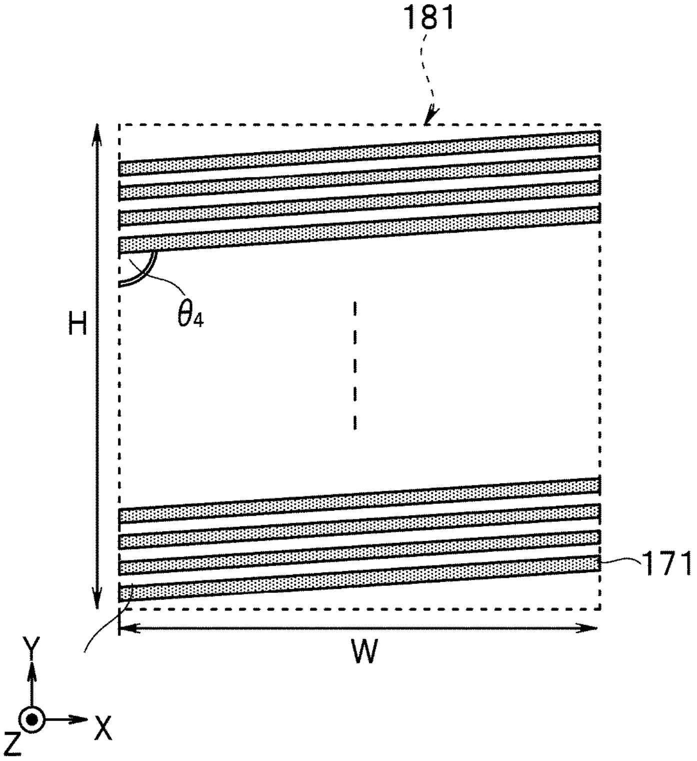
FIG. 6D is a plan view of a fourth pixel layer as viewed from above in the Z direction.

FIG. 6A is a plan view of the first pixel layer 140 as viewed from above in the Z direction. FIG. 6B is a plan view of the second pixel layer 150 as viewed from above in the Z direction. FIG. 6C is a plan view of the third pixel layer 160 as viewed from above in the Z direction. FIG. 6D is a plan view of the fourth pixel layer 170 as viewed from above in the Z direction. In addition, in each of FIGS. 6A to 6D, the illustration of the insulating film 180 is omitted.

As illustrated in FIG. 6A, the first pixel layer 140 includes a plurality of first line-shaped pixels 141 extending in a direction in which an angle formed with the X-axis is $\theta_1$ and having a length H projected on the Y-axis. Usually, $\theta_1$ is set to a value smaller than n/2. The plurality of first line-shaped pixels 141 are arranged at equal intervals in the X direction. The plurality of first line-shaped pixels 141 are disposed in a detection area 181 having a size of W in the X direction and a size of H in the Y direction.

As illustrated in FIG. 6B, the second pixel layer 150 includes a plurality of second line-shaped pixels 151 extending in a direction in which an angle formed with the X-axis is $\theta_2$ and having a length H projected on the Y-axis. Usually, $\theta_2$ is set to a value larger than n/2. The plurality of second line-shaped pixels 151 are arranged at equal intervals in the X direction. The plurality of second line-shaped pixels 151 are also disposed in the detection area 181 having a size of W in the X direction and a size of H in the Y direction, as in the first line-shaped pixels 141.

As illustrated in FIG. 6C, the third pixel layer 160 includes a plurality of third line-shaped pixels 161 extending in a direction in which an angle formed with the Y-axis is $\theta_3$ and having a length W projected on the X-axis. Usually, $\theta_3$ is set to a value smaller than n/2. The plurality of third line-shaped pixels 161 are arranged at equal intervals in the Y direction. The plurality of third line-shaped pixels 161 are arranged at equal intervals in the X direction. The plurality of third line-shaped pixels 161 are also disposed in the detection area 181 having a size of W in the X direction and a size of H in the Y direction, as in the first line-shaped pixels 141.

As illustrated in FIG. 6D, the fourth pixel layer 170 includes a plurality of fourth line-shaped pixels 171 extending in a direction in which an angle formed with the Y-axis is $\theta_4$ and having a length W projected on the X-axis. Usually, $\theta_4$ is set to a value larger than n/2. The plurality of fourth line-shaped pixels 171 are arranged at equal intervals in the Y direction. The plurality of fourth line-shaped pixels 171 are arranged at equal intervals in the X direction. The plurality of fourth line-shaped pixels 171 are also disposed in the detection area 181 having a size of W in the X direction and a size of H in the Y direction, as in the first line-shaped pixels 141.

As illustrated in FIG. 5, in the first pixel layer 140, the plurality of first line-shaped pixels 141 are physically and electrically separated from each other by the insulating film 180. In the second pixel layer 150, the plurality of second line-shaped pixels 151 are physically and electrically separated from each other by the insulating film 180. As illustrated in FIGS. 5 and 6C, in the third pixel layer 160, the plurality of third line-shaped pixels 161 are physically and electrically separated from each other by the insulating film 180. As illustrated in FIG. 5 and FIG. 6D, in the fourth pixel layer 170, the plurality of fourth line-shaped pixels 171 are physically and electrically separated from each other by being disposed in parallel. Further, as illustrated in FIG. 5, the line-shaped pixels disposed in the adjacent layers (the first line-shaped pixel 141 and the second line-shaped pixel 151, the second line-shaped pixel 151 and the third line-shaped pixel 161, and the third line-shaped pixel 161 and the fourth line-shaped pixel 171) are physically and electrically separated from each other by the insulating film 180.

For example, a superconducting nanostrip detector (superconducting single photon detector) is used for the first line-shaped pixel 141, the second line-shaped pixel 151, the third line-shaped pixel 161, and the fourth line-shaped pixel 171. In this case, the width and the thickness (the length in the Z direction in FIG. 5) of each of the first line-shaped pixel 141, the second line-shaped pixel 151, the third line-shaped pixel 161, and the fourth line-shaped pixel 171 are determined such that the cross-sectional area of each of the first line-shaped pixel 141, the second line-shaped pixel 151, the third line-shaped pixel 161, and the fourth line-shaped pixel 171 is reduced to the extent that the superconducting area is segmented.

Figure 7:
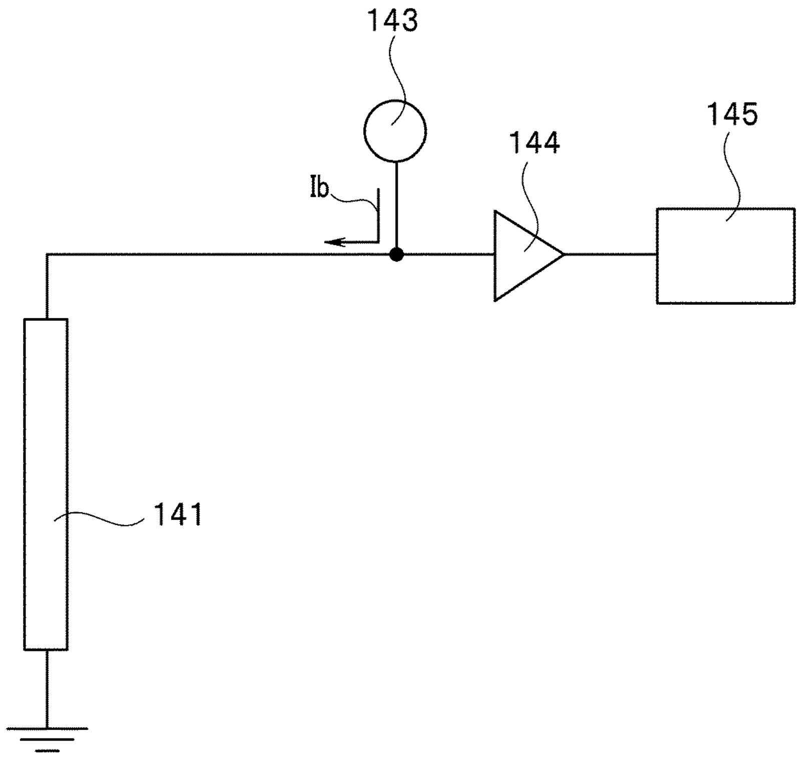
FIG. 7 is a principle circuit configuration view of the image detector.

FIG. 7 is a principle circuit configuration view of the image detector 14 according to the present embodiment. More specifically, FIG. 7 illustrates a circuit configuration when the superconducting nanostrip detector is used. FIG. 7 illustrates one of a plurality of the disposed superconducting strips (first line-shaped pixel) 141, and a current source 143, an amplifier 144, and a measuring device 145 corresponding to the one superconducting strip 141.

As illustrated in FIG. 7, each of the superconducting strips 141 has one end which is grounded. The superconducting strip 141 has another end which is connected to the current source 143 and the amplifier 144. The current source 143 supplies bias current Ib to the superconducting strip 141. The amplifier 144 amplifies the electrical signal generated by the superconducting strip 141 and transmits an output signal (electrical signal) to the measuring device 145. The measuring device 145 counts pulsed output signals (electrical signals) transmitted from the amplifier 144 when X-ray photons are detected by the superconducting strip 141. The current source 143, the amplifier 144, and the measuring device 145 may also be provided outside the image detector 14. For example, a configuration in which the current source 143, the amplifier 144, and the measuring device 145 are provided in the control analysis unit 31 may also be adopted.

Figure 8:
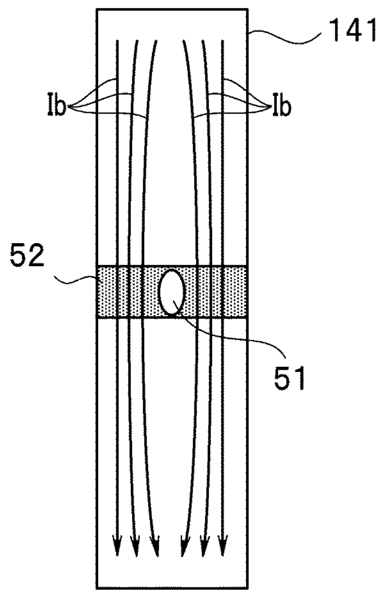
FIG. 8 is a diagram illustrating a detection principle of X-ray photons in a superconducting strip.

FIG. 8 is a diagram illustrating a detection principle of X-ray photons in the superconducting strip. First, the superconducting strip 141 is cooled to a temperature lower than or equal to the transition temperature by a refrigerator (not illustrated) to be in a superconducting state. Then, the current source 143 supplies the bias current Ib that is slightly below the critical current for maintaining the superconducting state of the superconducting strip 141. In this state, X-ray photons are incident on the superconducting strip 141.

At this time, the width and thickness of the superconducting strip 141 are formed to be about 50 to 500 nm, and the cross-sectional area of the superconducting strip 141 is small. Therefore, when the X-ray photons are absorbed by the superconducting strip 141, as illustrated in FIG. 8, an area (hotspot area) 51 that transitions to normal conduction called a hotspot is formed in the superconducting area of the superconducting strip 141. Since the electrical resistance of the hotspot area 51 increases, as illustrated in FIG. 8, the bias current Ib bypasses the hotspot area 51 and flows in a bypass area 52, which is another area.

Then, when a current which is equal to or higher than the critical current flows through the bypass area 52, the bypass area 52 transitions to normal conduction, the electrical resistance increases, and finally the superconducting area of the superconducting strip 141 is segmented. That is, a state where the superconducting area of the above-described superconducting strip 141 is segmented (segmented state) occurs. After that, the hotspot area 51 and the bypass area 52 that have transitioned to normal conduction rapidly disappear by cooling, and thus the pulsed electrical signal is generated by a temporary electrical resistance generated by the segmentation of the superconducting area of the superconducting strip 141. By amplifying the pulsed electrical signal with the amplifier 144 and counting the pulsed electrical signal with the measuring device 145, the number of X-ray photons can be detected. The circuit configuration of the superconducting strip (second line-shaped pixel) 151, the superconducting strip (third line-shaped pixel) 161, and the superconducting strip (fourth line-shaped pixel) 171, and the detection principle of the X-ray photons are the same as those of the superconducting strip (first line-shaped pixel) 141 described above. The number of X-ray photons (photons) counted by the measuring device 145 for each of the superconducting strips 141, 151, 161, and 171, that is, the detection result of the image detector 14 is output to the control analysis unit 31.

Most of the X-rays reaching the fourth line-shaped pixel 171 transmitted through the fourth line-shaped pixel 171, and a part of the X-rays is absorbed and detected by the fourth line-shaped pixel 171. In the third line-shaped pixel 161, a part of the X-rays, which transmitted through the fourth line-shaped pixel 171 or the insulating film 180 and reach the third line-shaped pixel, is absorbed and detected by the third line-shaped pixel 161. Similarly, in the second line-shaped pixel 151, a part of the X-rays, which further transmitted through the third line-shaped pixel 161 or the insulating film 180 and reach the second line-shaped pixel, is absorbed and detected by the second line-shaped pixel 151. Similarly, in the first line-shaped pixel 141, a part of the X-rays, which further transmitted through the second line-shaped pixel 151 or the insulating film 180 and reach the first line-shaped pixel, is absorbed and detected by the first line-shaped pixel 141. Therefore, the intensity of the X-rays uniformly irradiated on the upper surface of the detection body 100 and detected by the first to fourth line-shaped pixels may differ depending on the pixel layer.

Here, when the total sum of the intensities detected in all the fourth line-shaped pixels 171 disposed in the fourth pixel layer 170 is 1, the total sum of the intensities detected in each of the pixel layers is represented by the following value. That is, the total sum of the intensities detected by all the first line-shaped pixels 141 disposed in the first pixel layer 140 is set to $1/k_1$, the total sum of the intensities detected by all the second line-shaped pixels 151 disposed in the second pixel layer 150 is set to $1/k_2$, and the total sum of the intensities detected by all the third line-shaped pixels 161 disposed in the third pixel layer 160 is set to $1/k_3$. In this case, when the intensity output from the first line-shaped pixel 141 is multiplied by $k_1$, the intensity output from the second line-shaped pixel 151 is multiplied by $k_2$, and the intensity output from the third line-shaped pixel 161 is multiplied by $k_3$, and the intensity detected by the first, second, and third line-shaped pixels 141, 151, and 161 can be corrected to be equivalent to the intensity detected by the fourth line-shaped pixel 171. In the following description, the intensity detected by the first, second, and third line-shaped pixels 141, 151, and 161 is corrected by multiplying the intensity by $k_1$, $k_2$, and $k_3$, and the corrected intensity is referred to as the "intensity" of each of the line-shaped pixels.

The control analysis unit 31 as an image processing unit (or imaging processor) configured to analyze a signal (detection result) output from the image detector 14, and reconstruct the image (two-dimensional image) of the subject 41. For example, a personal computer including a central processing unit (CPU) and a memory (RAM) may be used as the control analysis unit 31. An operation of reconstructing the image of the subject 41 is performed by software, for example, by storing the operation in a memory in advance as a program and executing the operation in the CPU. In addition, the operation of reconstructing the image of the subject 41 may be performed by one or more processors configured as hardware. For example, it may be a processor configured as an electronic circuit, or a processor configured with an integrated circuit such as a field programmable gate array (FPGA). The control analysis unit 31 also outputs a control signal to the stage drive unit 23 that moves the stage 22 in the D1 direction or the D2 direction.

Next, an image generation method using the above-described image capturing device will be described. First, the subject 41 is placed on the stage 22, and the subject 41 is moved such that the X-rays are irradiated to an area (observation area) to be observed in the structure. When the X-rays are irradiated from the light source 11, an image in the observation area of the subject 41 is formed on the detection body 100 of the image detector 14. Then, the signals (detection intensities) detected by the first line-shaped pixel 141, the second line-shaped pixel 151, the third line-shaped pixel 161, and the fourth line-shaped pixel 171 are output to the control analysis unit 31. The control analysis unit 31 uses the detection intensities of the first line-shaped pixel 141, the second line-shaped pixel 151, the third line-shaped pixel 161, and the fourth line-shaped pixel 171 to reconstruct an image in the observation area of the subject 41, and outputs the reconstructed image.

Figure 9:
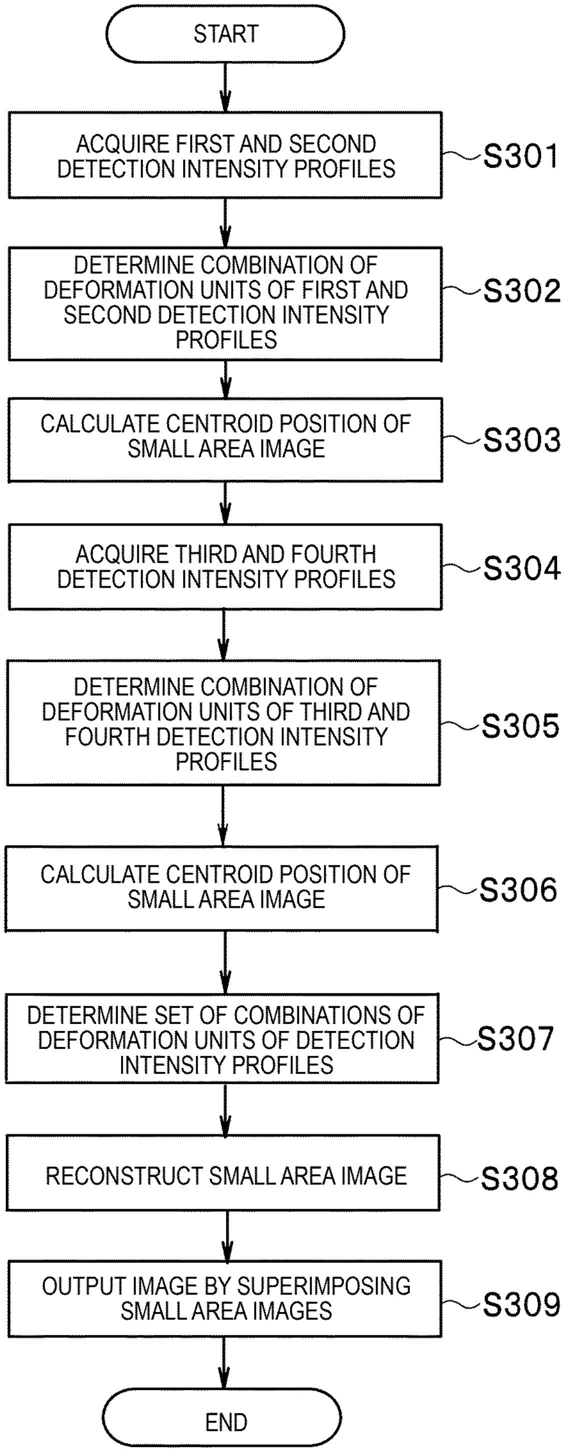
FIG. 9 is a flowchart illustrating an example of an image generation method according to the first embodiment.

Here, a method of reconstructing an image of the subject 41 from the detection intensities of each of the first line-shaped pixel 141, the second line-shaped pixel 151, the third line-shaped pixel 161, and the fourth line-shaped pixel 171 will be described. FIG. 9 is a flowchart illustrating an example of an image generation method according to the first embodiment. In the following description, it is assumed that the XY coordinates are set with the center of the detection area 181 as the origin, and the positions of the first line-shaped pixel 141 and the second line-shaped pixel 151 in each line are indicated by the X coordinate at the intersection of each line and the X-axis. In addition, the positions of the third line-shaped pixel 161 and the fourth line-shaped pixel 171 in each line are indicated by the Y coordinate at the intersection of each line and the Y-axis.

Figure 10A:
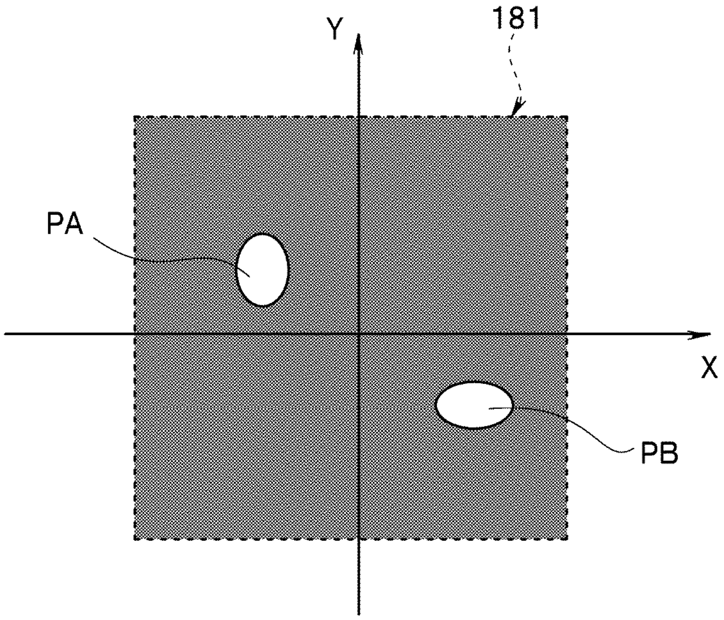
FIG. 10A is a diagram illustrating an example of an image formed on a detection body.

FIG. 10A is a diagram illustrating an example of an image formed on the detection body. When there is a deformed portion such as a defect in the subject 41, as illustrated in FIG. 10A, a small area image corresponding to the deformed portion appears in the image formed on the detection body 100. FIG. 10A illustrates a case where the image formed on the detection body has a background of uniform optical intensity and two small area images PA and PB as an example. An image generation method in the present embodiment will be described by using a case where there are two small area images PA and PB in an image formed on the detection body as an example. In addition, in order to simplify the calculation, the optical intensity of the background part is set to zero.

Figure 10B:
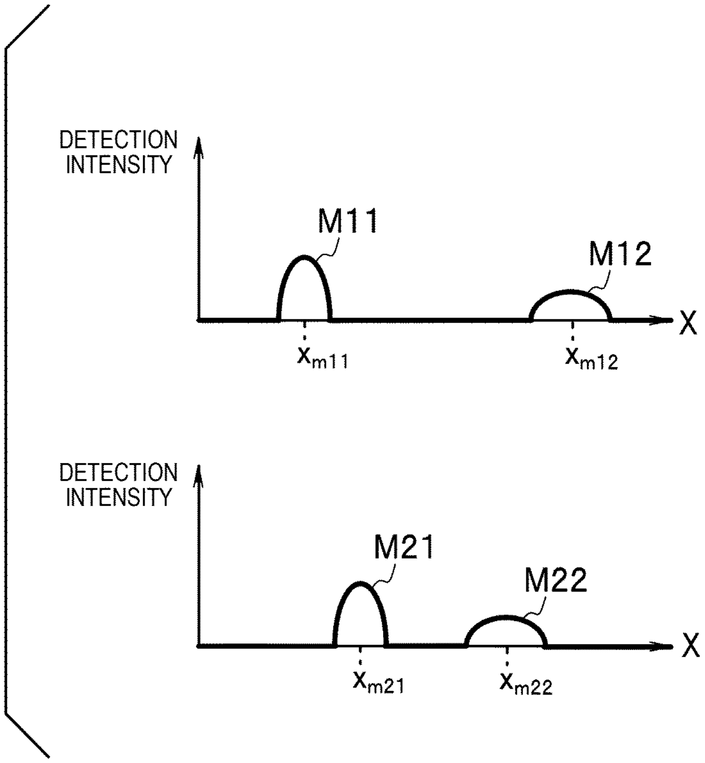
FIG. 10B is a diagram illustrating an example of first and second detection intensity profiles of the image illustrated in FIG. 10A.

First, the first and second detection intensity profiles are acquired by using the detection bodies illustrated in FIGS. 5 and 6 (FIG. 9, S301). FIG. 10B is a diagram illustrating an example of the first and second detection intensity profiles of the image illustrated in FIG. 10A. The upper part of FIG. 10B is an example of the first detection intensity profile, and the lower part of FIG. 10B is an example of the second detection intensity profile. The detection intensity is acquired for each of the plurality of first line-shaped pixels 141 disposed in the first pixel layer 140. The first detection intensity profile illustrated at the upper part of FIG. 10B is acquired by plotting the detection intensity with respect to the X coordinate at the intersection of the line and the X-axis. The detection intensity is acquired for each of the plurality of second line-shaped pixels 151 disposed in the second pixel layer 150. The second detection intensity profile illustrated at the lower part of FIG. 10B is acquired by plotting the detection intensity with respect to the X coordinate at the intersection of the line and the X-axis.

Next, a combination of the deformed portions of the first and second detection intensity profiles is determined (FIG. 9, S302). The deformed portion is a part where the detection intensity is higher than the intensity of the uniform background part in the detection intensity profile. That is, the deformed portion is a part having a projected profile shape with respect to a uniform background part. As illustrated in FIG. 10A, the detection area 181 has two small area images PA and PB. As a result, the first detection intensity profile illustrated at the upper part in FIG. 10B has two deformed portions M11 and M12. Further, in the second detection intensity profile illustrated at the lower part of FIG. 10B, two deformed portions M21 and M22 are present due to the small area images PA and PB. In S302, a combination of the deformed portions M11 and M12 of the first detection intensity profile and the deformed portions M21 and M22 of the second detection intensity profile, which are caused by the same small area image PA (PB), is determined.

Figure 11A:
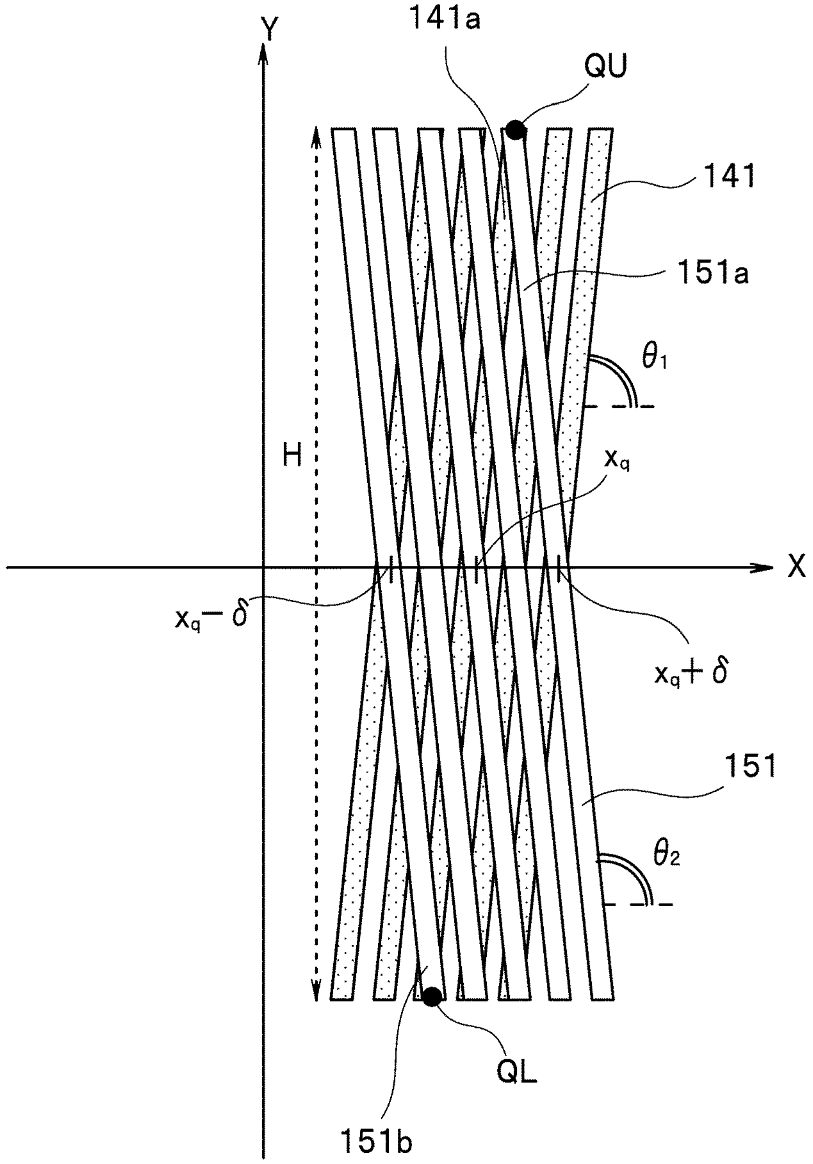
FIG. 11A is a diagram illustrating a positional relationship between a first line-shaped pixel and a second line-shaped pixel.

FIG. 11A is a diagram illustrating a positional relationship between the first line-shaped pixel and the second line-shaped pixel. FIG. 11A illustrates several pixels among the plurality of first line-shaped pixels 141 disposed in the first pixel layer 140. In addition, FIG. 11A also illustrates the second line-shaped pixel 151 having the same X coordinate as the first line-shaped pixels 141.

As illustrated in FIG. 11A, it is assumed that a point image QU is present at the uppermost portion (upper end in the Y direction) of one line among the plurality of first line-shaped pixels 141, and a point image QL is present at the lowermost portion (lower end in the Y direction) of the same first line-shaped pixel 141*a*. That is, in the first pixel layer 140, both QU and QL are detected on the same line (the first line-shaped pixel 141*a*).

Figure 11B:
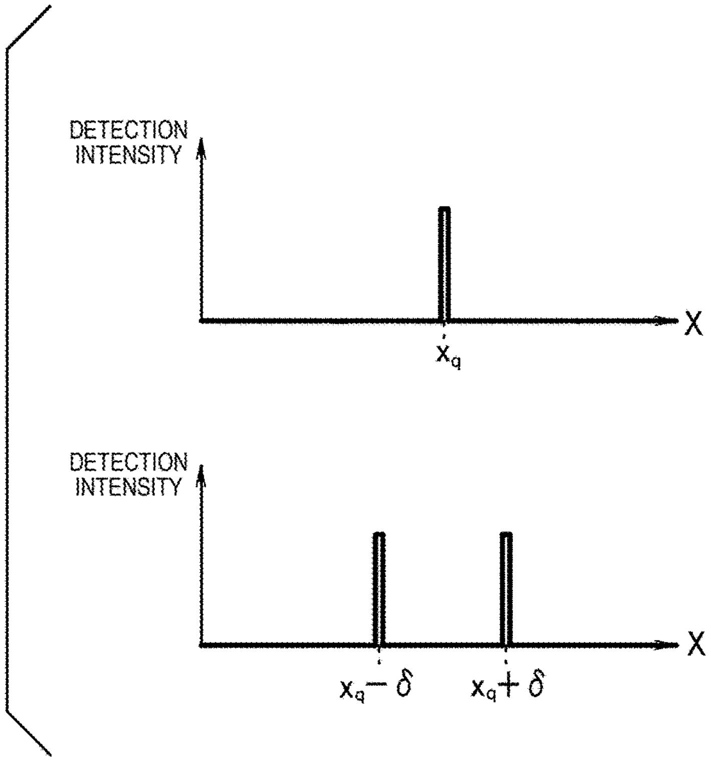
FIG. 11B is a diagram illustrating an example of the first and second detection intensity profiles.

FIG. 11B is a diagram illustrating an example of the first and second detection intensity profiles. The upper part of FIG. 11B is an example of the first detection intensity profile, and the lower part of FIG. 11B is an example of the second detection intensity profile. The X coordinate of the deformed portion of the first detection intensity profile by the point image QU or QL is denoted by xq (upper part in FIG. 11B). The $x_q$ corresponds to the X coordinate at the intersection of a straight line parallel to the first line-shaped pixel 141 and including the point image QU or the point image QL and the X-axis.

On the other hand, in the second line-shaped pixel 151, the point image QU and the point image QL are detected in different lines. For example, the point image QU is detected by the second line-shaped pixel 151*a*, and the point image QL is detected by a second line-shaped pixel 151*b*. As illustrated at the lower part of FIG. 11B, the deformed portion of the second detection intensity profile by the point image QU appears at the X coordinate position of $x_q+\delta$, and the deformed portion by the point image QL appears at the X coordinate position of $x_q-\delta$. Here, δ is represented by the following Formula (1).

$$\delta = H(1/(2\tan\theta_1) - 1/(2\tan\theta_2)) \quad \text{Formula (1)}$$

That is, when a point image is detected as a deformed portion at the position $x_1$ of the first detection intensity profile, the position ($x_2$) at which the same point image is detected as a deformed portion of the second detection intensity profile is within the range of the following Formula (2).

$$x_1 - \delta \le x_2 \le x_1 + \delta \quad \text{Formula (2)}$$

Referring to FIG. 10B again, in the first detection intensity profile, when the X coordinate of the centroid position of the deformed portion M11 is $x_{m11}$, $x_{m11}$ is obtained by the following Formula (3).

$$x_{m11} = \sum(I_1(x)x) \Big/ \sum I_1(x) \quad \text{Formula (3)}$$

In Formula (3), $I_1$ (x) is a detection intensity of the first detection intensity profile, and an integration range is an X-coordinate range of the deformed portion M11.

In the second detection intensity profile illustrated at the lower part of FIG. 10B, the X coordinate of the centroid position of the deformed portion due to the same small area image as the deformed portion M11 is within the range of $x_2$ when $x_{m11}$ is substituted for $x_1$ in Formula (2). In addition, since the area of the deformed portion of the detection intensity profile corresponds to the total sum of the image intensities of the small area images, the area of the deformed portion of the first detection intensity profile and the area of the deformed portion of the second detection intensity profile are the same when the deformed portion of the first detection intensity profile and the deformed portion of the second detection intensity profile are caused by the same small area image. Here, the intensity detected by the first line-shaped pixel 141 and the second line-shaped pixel 151 varies, and the area of the deformed portion of both also varies. The determination regarding whether the both are the same is made based on whether the areas of the deformed portions of both match each other within an error range estimated from the variations.

For example, when the X coordinate $x_{m11}$ of the centroid position of the deformed portion M11 in the first detection intensity profile and the X coordinate $x_{m21}$ of the centroid position of the deformed portion M21 in the second detection intensity profile satisfy the relationship of Formula (2), and the areas of the deformed portion M11 and the deformed portion M21 are considered to be the same, M11 and M21 are determined as a combination of deformed portions caused by the same small area image. The determination regarding whether the combinations of all the deformed portions, such as the deformed portion M12 and the deformed portion M22, are the same, is made, and the combination of the deformed portions caused by the same small area image is determined. In a case of the detection intensity profile illustrated in FIG. 10B, by executing S302, two combinations, that is, a combination C121 of the deformed portion M11 and the deformed portion M21 and a combination C122 of the deformed portion M12 and the deformed portion M22 are determined.

Figure 12A:
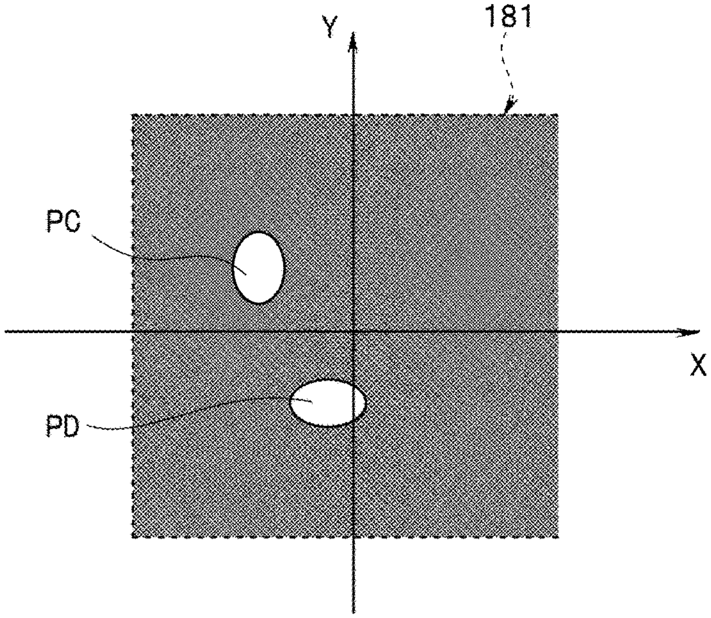
FIG. 12A is a diagram illustrating another example of an image formed on the detection body.
Figure 12B:
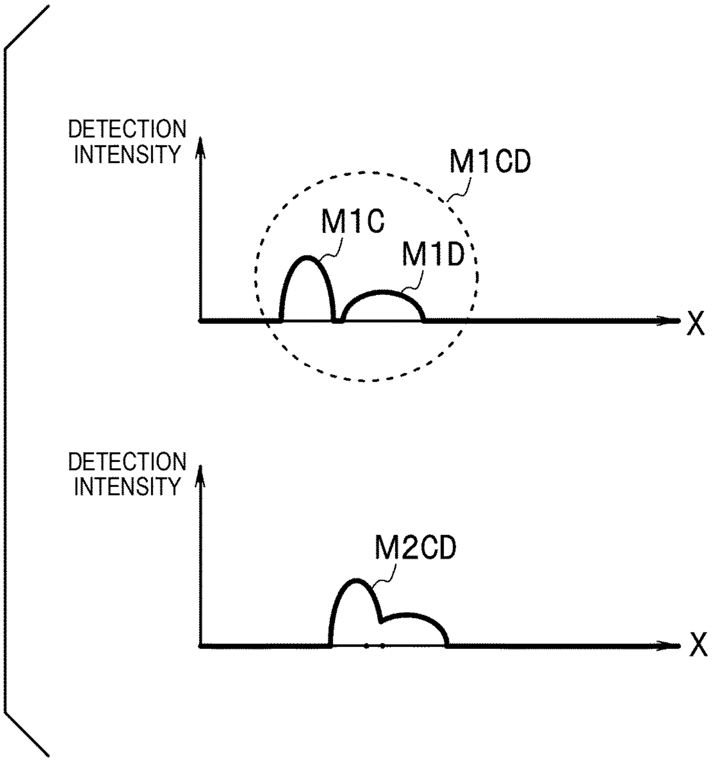
FIG. 12B is a diagram illustrating an example of first and second detection intensity profiles of the image illustrated in FIG. 12A.
Figure 12C:
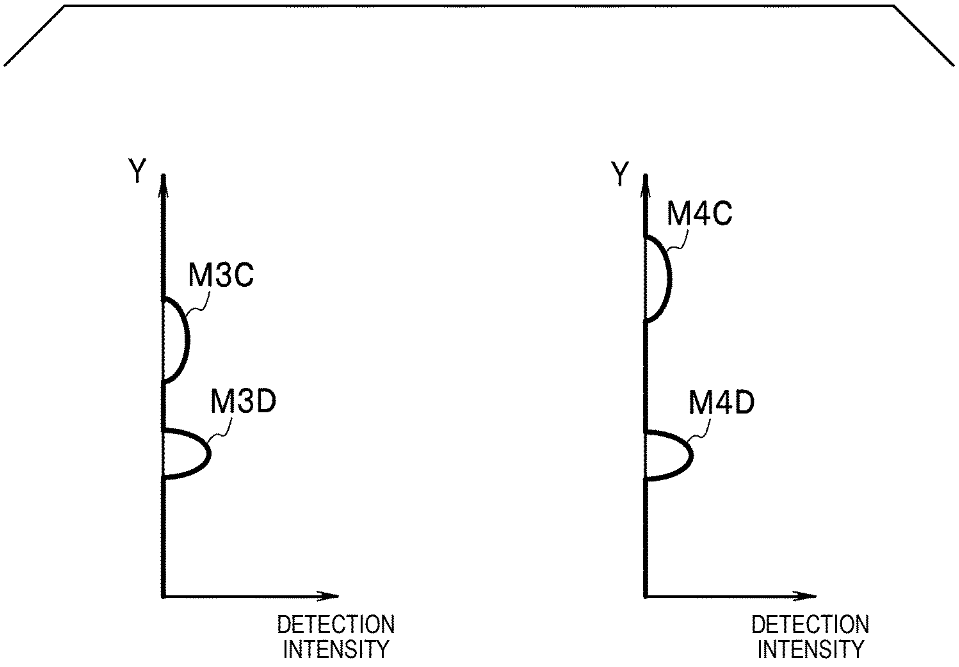
FIG. 12C is a diagram illustrating an example of third and fourth detection intensity profiles of the image illustrated in FIG. 12A.

FIG. 12A is a diagram illustrating another example of an image formed on the detection body. FIG. 12B is a diagram illustrating an example of the first and second detection intensity profiles of the image illustrated in FIG. 12A. The upper part of FIG. 12B is an example of the first detection intensity profile, and the lower part of FIG. 12B is an example of the second detection intensity profile. FIG. 12C is a diagram illustrating an example of the third and fourth detection intensity profiles of the image illustrated in FIG. 12A. The left side of FIG. 12C is an example of the third detection intensity profile, and the right side of FIG. 12C is an example of the fourth detection intensity profile. As illustrated in FIG. 12A, when two small area images PC and PD are present in the detection area 181, as illustrated at the upper part of FIG. 12B, two deformed portions MIC and MID are separated in the first detection intensity profile. In contrast, as illustrated at the lower part of FIG. 12B, the second detection intensity profile may overlap like the deformed portion M2CD. In this case, the deformed portion MIC and the deformed portion MID are collectively regarded as one deformed portion M1CD, and the deformed portion M1CD and the deformed portion M2CD are determined as a combination of the deformed portions caused by the same small area image.

Subsequently, a centroid position of the small area image is calculated (FIG. 9, S303). The coordinates ($x_{12p}$, $y_{12p}$) of the centroid position of the small area image are obtained from the X coordinate $x_{1p}$ of the centroid position of the deformed portion in the first detection intensity profile and the X coordinate $x_{2p}$ of the centroid position of the deformed portion in the second detection intensity profile by using the principle of triangulation. That is, the coordinates of the centroid position of the small area image are calculated using the following Formulae (4a) and (4b).

$$x_{12p} = (x_{1p}\tan\theta_1 - x_{2p}\tan\theta_2)/(\tan\theta_1 - \tan\theta_2) \quad \text{Formula (4a)}$$

$$y_{12p} = (x_{1p} - x_{2p})\tan\theta_1\tan\theta_2/(\tan\theta_1 - \tan\theta_2) \quad \text{Formula (4b)}$$

In S303, for all the combinations of the deformed portion of the first detection intensity profile and the deformed portion of the second detection intensity profile determined in S302, the coordinates of the centroid position of the small area image are calculated using the Formulae (4a) and (4b). For example, for the combination C121 of the deformed portion M11 and the deformed portion M21, the centroid coordinates ($x_{m121}/y_{m121}$) of the small area image are calculated by substituting $x_{1p}$ for $x_{m11}$ and $x_{2p}$ for $x_{m21}$ into the Formulae (4a) and (4b). For another combination C122 determined in S302, the coordinates ($x_{m122}$, $y_{m122}$) of the centroid position of the small area image are calculated in the same manner.

Figure 10C:
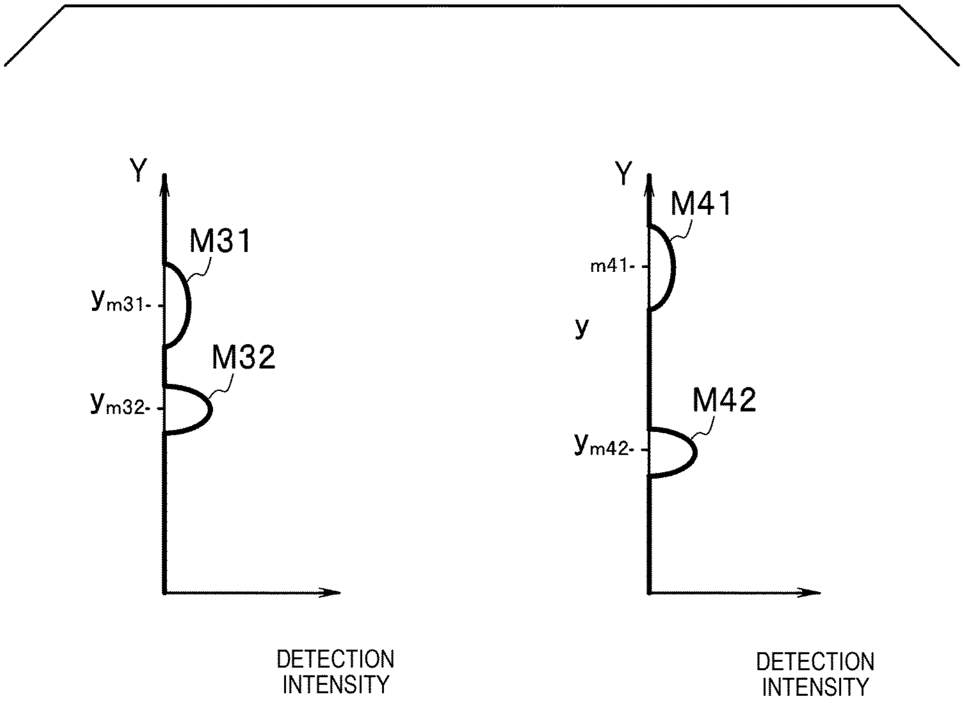
FIG. 10C is a diagram illustrating an example of third and fourth detection intensity profiles of the image illustrated in FIG. 10A.

Next, the third and fourth detection intensity profiles are acquired using the detection bodies illustrated in FIGS. 5 and 6 (FIG. 9, S304). FIG. 10C is a diagram illustrating an example of the third and fourth detection intensity profiles of the image illustrated in FIG. 10A. The left side of FIG. 10C is an example of the third detection intensity profile, and the right side of FIG. 10C is an example of the fourth detection intensity profile. The detection intensity is acquired for each of the plurality of third line-shaped pixels 161 disposed in the third pixel layer 160. The third detection intensity profile illustrated on the left side in FIG. 10C is acquired by plotting the detection intensity with respect to the Y coordinate at the intersection of the line and the Y-axis. The detection intensity is acquired for each of the plurality of fourth line-shaped pixels 171 disposed in the fourth pixel layer 170. The fourth detection intensity profile illustrated on the right side in FIG. 10C is acquired by plotting the detection intensity with respect to the Y coordinate at the intersection of the line and the Y-axis.

Next, the combination of the deformed portions of the third and fourth detection intensity profiles is determined (FIG. 9, S305). The combination determination method in S305 is the same as the combination determination method used in S302 except that the X coordinate is replaced with the Y coordinate. For example, in a case of the detection intensity profile illustrated in FIG. 10C, by executing S305, two combinations, that is, a combination C341 of the deformed portion M31 and the deformed portion M41 and a combination C342 of the deformed portion M32 and the deformed portion M42 are determined.

Next, the coordinates of the centroid position of the small area image are calculated for all the combinations determined in S305 (FIG. 9, S306). The coordinates ($x_{34p}$, $y_{34p}$) of the centroid position of the small area image are obtained from the Y coordinate $y_{3p}$ of the centroid position of the deformed portion in the third detection intensity profile and the Y coordinate yap of the centroid position of the deformed portion in the fourth detection intensity profile by using the principle of triangulation. The calculation of the coordinates in S306 may use the formulae obtained by replacing the X coordinate with the Y coordinate, the Y coordinate with the X coordinate, $\theta_1$ with $\theta_3$, and $\theta_2$ with $\theta_4$ in Formulae (4a) and (4b). By executing S306, for example, the centroid coordinates ($x_{m341}$, $y_{m341}$) of the small area image are calculated for the combination C341 of the deformed portion M31 and the deformed portion M41. In addition, for the combination C342 of the deformed portion M32 and the deformed portion M42, the centroid coordinates ($x_{m342}$/$y_{m342}$) of the small area image are calculated.

Subsequently, a set of combinations of the deformed portions of the detection intensity profiles is determined (FIG. 9, S307). That is, a set of combinations in which the coordinate of the centroid position of the small area image and the area of the deformed portion are the same is determined from the combination of the deformed portion of the first detection intensity profile and the deformed portion of the second detection intensity profile and the combination of the deformed portion of the third detection intensity profile and the deformed portion of the fourth detection intensity profile. The S307 is a procedure for identifying a deformed portion of the detection intensity profile caused by the same small area image and associating the deformed portion as a set.

In S302, it is assumed that two combinations, that is, the combination C121 (the deformed portion M11 and the deformed portion M21) and the combination C122 (the deformed portion M12 and the deformed portion M22) are determined as a combination of the deformed portion of the first detection intensity profile and the deformed portion of the second detection intensity profile. In addition, in S305, it is assumed that two combinations, that is, the combination C341 (the deformed portion M31 and the deformed portion M41) and the combination C342 (the deformed portion M32 and the deformed portion M42) are determined as a combination of the deformed portion of the third detection intensity profile and the deformed portion of the fourth detection intensity profile. For example, it is determined whether the coordinates ($x_{m121}$, $y_{m121}$) of the centroid position of the combination C121 and the coordinates ($x_{m341}$, $y_{m341}$) of the centroid position of the combination C341 match each other. At this time, when the coordinates of the two centroid positions match each other within a range estimated from the position error and the error of the detection intensity, the two centroid positions are determined to be the same.

In addition, it is determined whether the area of the deformed portion in the combination C121 and the area of the deformed portion in the combination C341 match each other. This is also determined to be the same when the values match each other within a range of variation. When it is determined that the coordinates of the centroid position are the same and it is determined that the area of the deformed portion is also the same, the combination C121 and the combination C341 are determined as a set S1. In this case, the four deformed portions M11, M21, M31, and M41 are associated with each other as being caused by the same small area image. Similarly, the determination is made for other combination pairs, and the set is determined. For example, the combination C122 and the combination C342 are determined as a set S2.

Figure 13A:
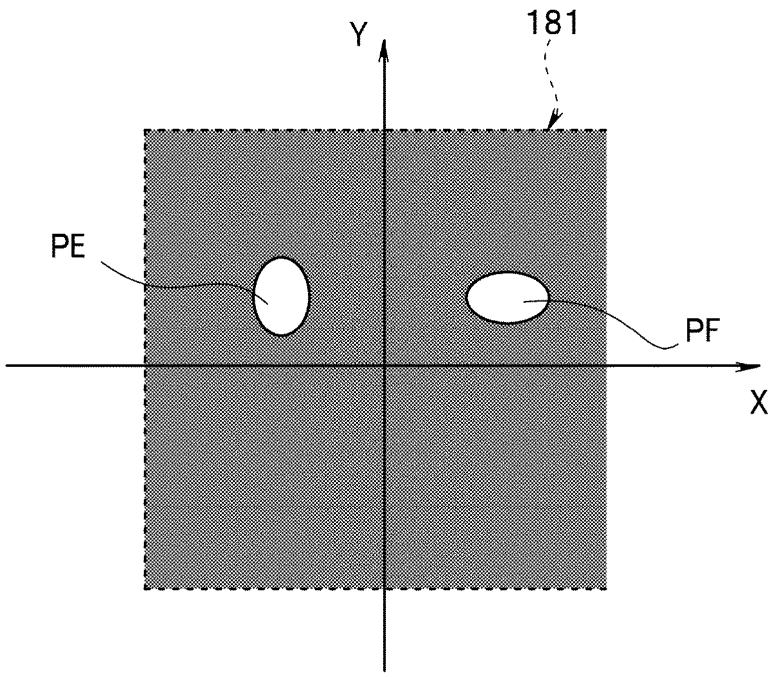
FIG. 13A is a diagram illustrating another example of an image formed on a detection body.
Figure 13B:
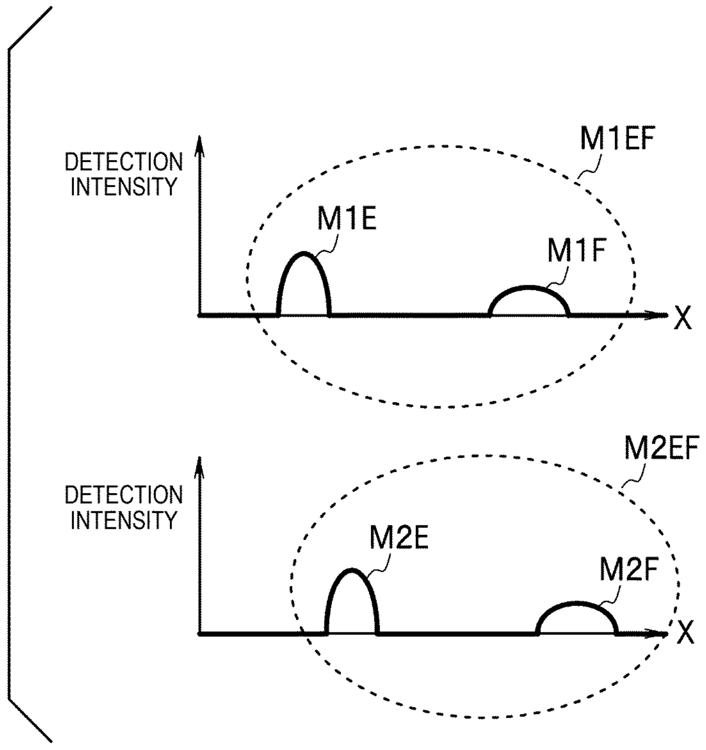
FIG. 13B is a diagram illustrating an example of first and second detection intensity profiles of the image illustrated in FIG. 13A.
Figure 13C:
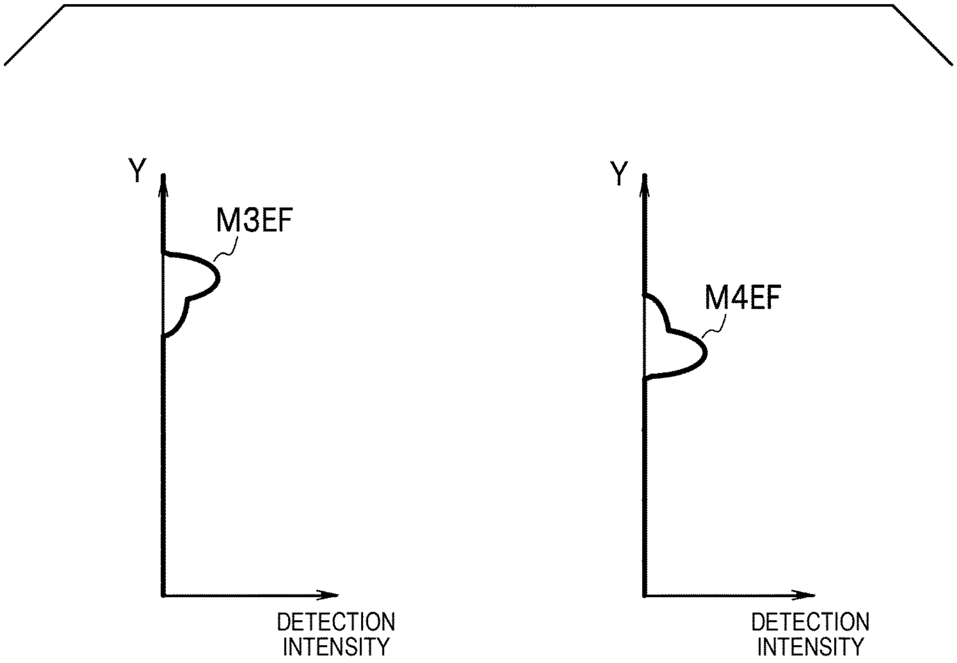
FIG. 13C is a diagram illustrating an example of third and fourth detection intensity profiles of the image illustrated in FIG. 13A.

FIG. 13A is a diagram illustrating another example of an image formed on the detection body. FIG. 13B is a diagram illustrating an example of the first and second detection intensity profiles of the image illustrated in FIG. 13A. The upper part of FIG. 13B is an example of the first detection intensity profile, and the lower part of FIG. 13B is an example of the second detection intensity profile. FIG. 13C is a diagram illustrating an example of the third and fourth detection intensity profiles of the image illustrated in FIG. 13A. The left side of FIG. 13C is an example of the third detection intensity profile, and the right side of FIG. 13C is a diagram illustrating an example of the fourth detection intensity profile. As illustrated in FIG. 13A, when two small area images PE and PF are present in the detection area 181 side by side in the X direction, as illustrated at the upper part of FIG. 12B, two deformed portions MIE and MIF are separated from each other in the first detection intensity profile. Further, as illustrated at the lower part of FIG. 13B, the two deformed portions M2E and M2F are separated in the second detection intensity profile. On the other hand, as illustrated in FIG. 13C, in the third detection intensity profile and the fourth detection intensity profile, as in the deformed portion M3EF and the deformed portion M4EF, there may be cases where the deformed portions caused by two small area images overlap each other and appear as a single deformed portion. In this case, the deformed portion MIE and the deformed portion MIF are collectively regarded as one deformed portion M1EF, and the deformed portion M2E and the deformed portion M2F are collectively regarded as one deformed portion M2EF. The deformed portions M1EF, M2EF, M3EF, and M4EF are associated with a set of deformed portions caused by the same small area image.

Figure 14A:
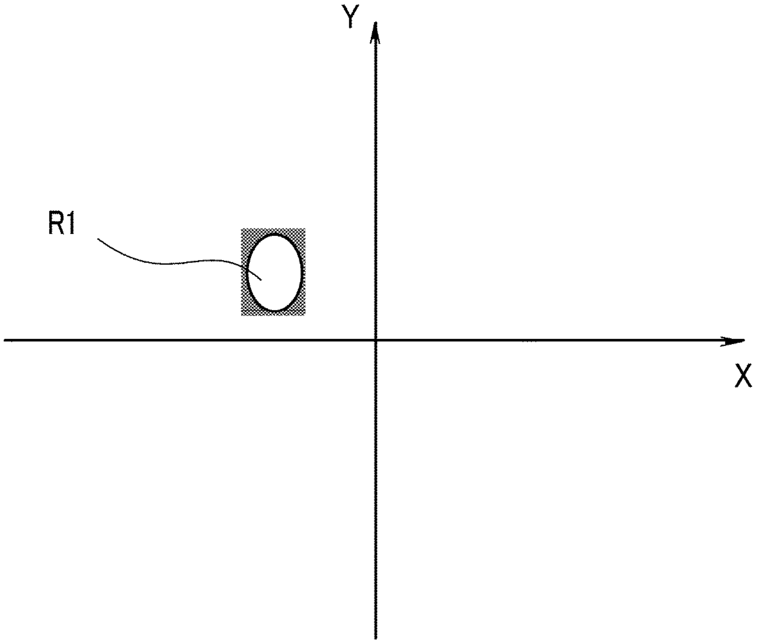
FIG. 14A is a diagram illustrating an example of a reconstructed small area image.
Figure 14B:
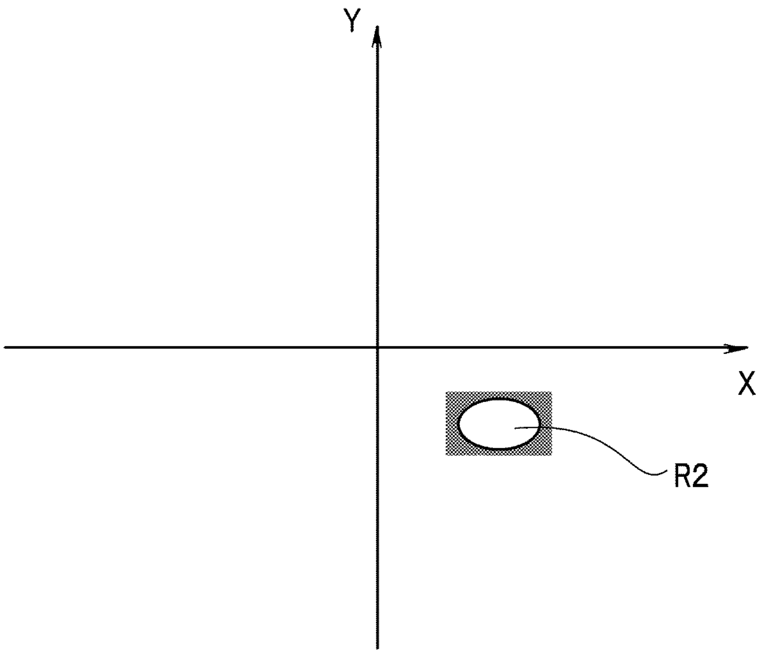
FIG. 14B is a diagram illustrating an example of a reconstructed small area image.

Next, the small area image is reconstructed (FIG. 9, S308). Four deformed portions (the deformed portion of the first detection intensity profile, the deformed portion of the second detection intensity profile, the deformed portion of the third detection intensity profile, and the deformed portion of the fourth detection intensity profile) associated with one set are used to reconstruct the small area image by using an existing method such as filtered back projection (FBP). When a plurality of sets are determined in S307, the small area image is reconstructed for each set. FIGS. 14A and 14B are diagrams illustrating an example of a reconstructed small area image. FIG. 14A illustrates a small area image R1 reconstructed by using the set S1 described above. FIG. 14B illustrates a small area image R2 reconstructed by using the set S2 described above. At this time, the area of the small area image R1 or the small area image R2 is determined as a minimum X or Y coordinate area including the deformed portion of the first detection intensity profile, the deformed portion of the second detection intensity profile, the deformed portion of the third detection intensity profile, and the deformed portion of the fourth detection intensity profile, which belong to the set S1 or S2.

Figure 14C:
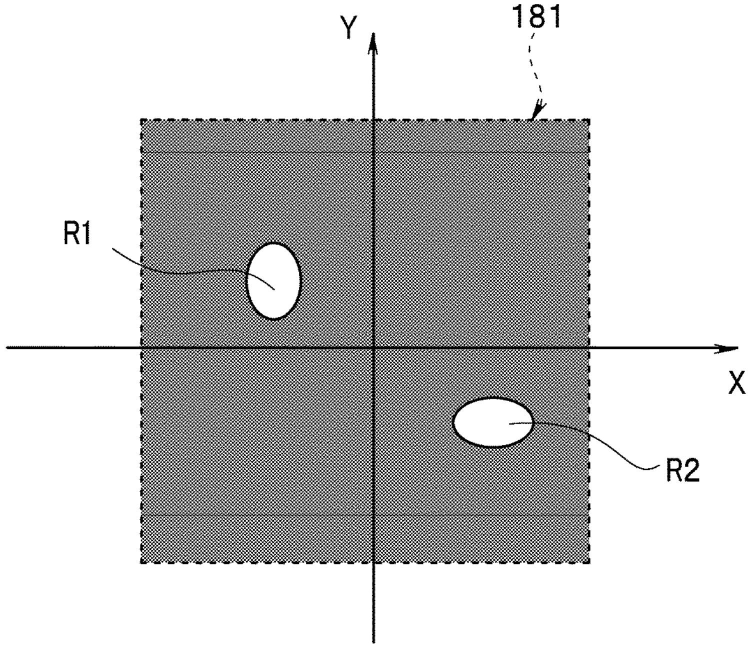
FIG. 14C is a diagram illustrating an example of a reconstructed image.

Finally, in S308, an image in which all the reconstructed small area images are superimposed on each other is output as an image formed on the detection body 100 (FIG. 9, S309). With the above, a series of procedures related to the image generation method according to the first embodiment are completed. FIG. 14C is a diagram illustrating an example of the reconstructed image. Since all the first to fourth detection intensity profiles described above are discrete data on the X coordinate or the Y coordinate, the reconstructed image is a detection intensity distribution at points arranged at equal intervals in the X direction and the Y direction.

In the above description, the background intensity is described as zero, but when the background intensity is present, the same processing may be performed using the detection intensity profile from which the background intensity is subtracted, and the background intensity may be added to the small area image obtained in S309 to calculate the image. At this time, the intensity of the deformed portion of the detection intensity profile may be lower than the intensity of the background portion, and the detection intensity profile of the deformed portion may be recessed.

In the image reconstruction by the FBP or the like, the larger the area of the image to be reconstructed and the smaller the number of lines in the line direction, the higher the possibility that the image different from the actual image, which is referred to as an architecture, is included. Therefore, for example, in order to obtain an image that is faithful to an actual image by using the method illustrated in Japanese Patent No. 7062547, it is necessary to increase the number in the line direction. That is, there is a possibility that the number of pixel layers in which the angle $\theta_m$ (m is an integer of 1 or more) formed by the line-shaped pixel and the X-axis (Y-axis) is different may increase, and there is a possibility that the manufacturing of the image detector becomes extremely difficult. For example, when using the line-shaped pixels having different angles with respect to the X-axis at 15-degree intervals, 12 line-shaped pixels parallel to the directions of θ=0, 15, 30, 45, 60, 75, 90, 105, 120, 135, 150, and 165 are required. In this case, the number of lines in the line direction is 12, and the detection body 100 requires 12 layers of pixel layers.

In contrast, in the image capturing device of the present embodiment, a set of deformed portions of the first to fourth detection intensity profiles is determined, and a small area image is reconstructed in a minimum XY coordinate area including the obtained set of the deformed portions. The small area images reconstructed in each area are superimposed on each other to acquire an image formed on the detection body 100 (an image of the entire detection area 181). Since the reconstruction is performed in an area smaller than the detection area 181, it is possible to output an image that is faithful to an actual image even with a small number of lines in the line direction. That is, the reconstructed image can be acquired with high accuracy while simplifying the manufacturing of the image detector.

Finally, a determination method in the line direction of each of the first to fourth line-shaped pixels 141, 151, 161, and 171 will be described. When $\theta_1=\pi-\theta_2$, $\theta_3=\pi-\theta_4$, $\theta_1=\theta_3$, and $\theta_2=\theta_4$, and an image having uniform resolution in the XY direction is reconstructed. Hereinafter, a method for determining $\theta_1$ to $\theta_4$ in this case will be described.

Figure 15A:
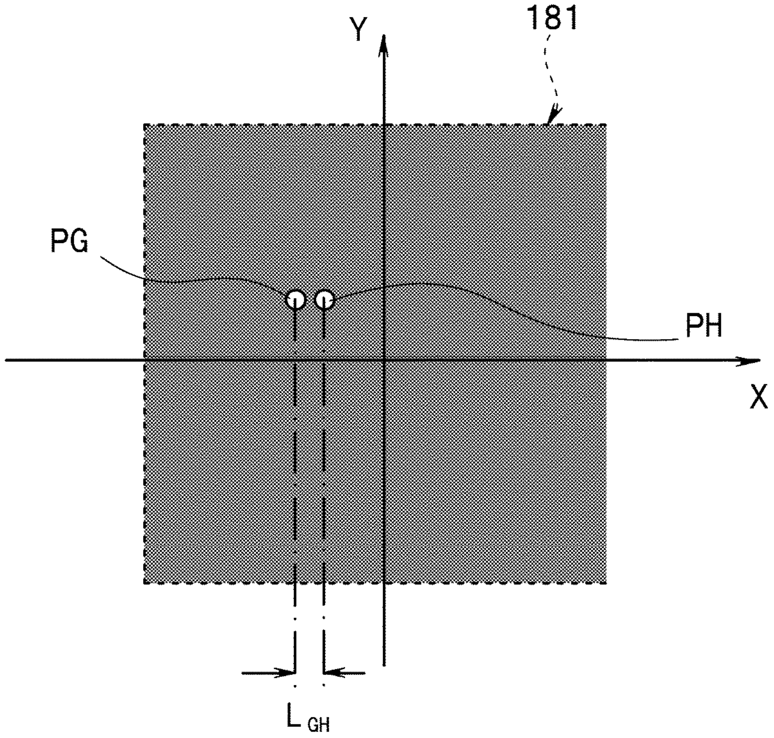
FIG. 15A is a diagram illustrating another example of an image formed on a detection body.
Figure 15B:
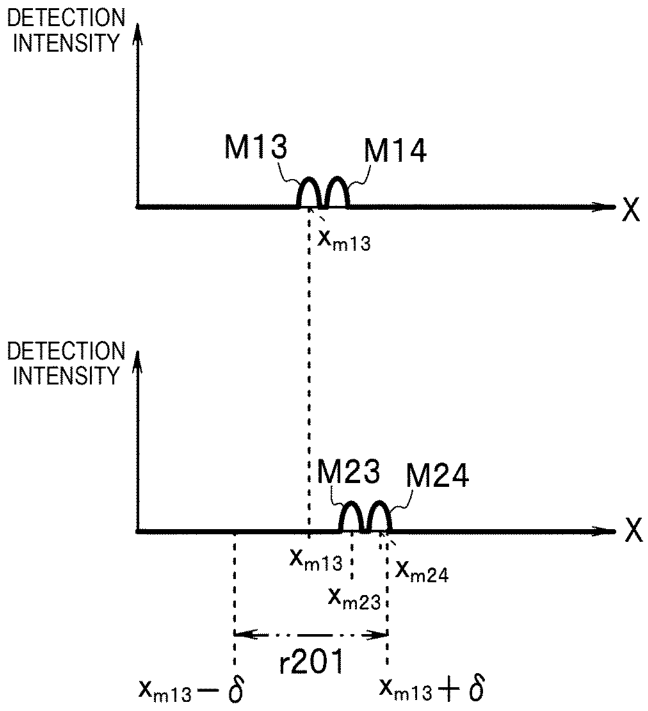
FIG. 15B is a diagram illustrating an example of first and second detection intensity profiles of the image illustrated in FIG. 15A.

FIG. 15A is a diagram illustrating another example of an image formed on the detection body. FIG. 15B is a diagram illustrating an example of the first and second detection intensity profiles of the image illustrated in FIG. 15A. The upper part of FIG. 15B is an example of the first detection intensity profile, and the lower part of FIG. 15B is an example of the second detection intensity profile. As illustrated in FIG. 15A, two circular small area images PG and PH having the same diameter and image intensity are disposed in the X direction. The distance between the small area images PG and PH is denoted by $L_{GH}$.

As illustrated in FIG. 15B, two deformed portions M13 and M14 appear in the first detection intensity profile. In addition, two deformed portions M23 and M24 also appear in the second detection intensity profile. A range r201 of the centroid position of the deformed portion on the second detection profile due to the same small area image as the deformed portion M13 of the first detection intensity profile can be obtained by Formula (2). As illustrated at the lower part of FIG. 15B, when both the centroid position $x_{m23}$ of the deformed portion M23 and the centroid position $x_{m24}$ of the deformed portion M24 are in the range r201, it is not possible to determine whether the deformed portions M23 and M24 are caused by the same small area image as the deformed portion M13. That is, when δ is $L_{GH}$ or more, it is impossible to determine the combination of the deformed portions. Therefore, using the relationships $\delta<L_{GH}$ and $\theta_1=\pi-\theta_2$ and Formula (1), the relationship of the following Formula (5) is established.

$$\theta_1 > \tan^{-1}(H/L_{GH}) \quad \text{Formula (5)}$$

Figure 16:
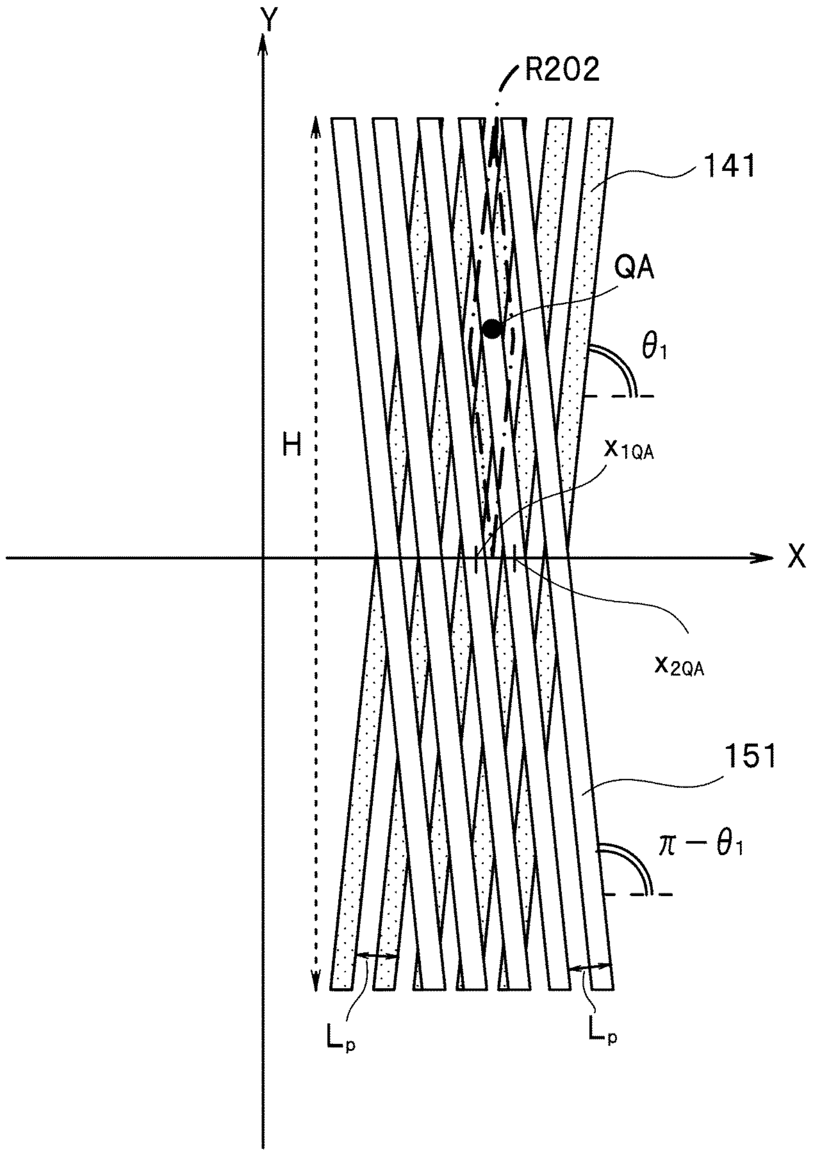
FIG. 16 is a diagram illustrating a positional relationship between the first line-shaped pixel and the second line-shaped pixel.

Meanwhile, since the detection intensity profile is discrete data instead of continuous data, an error due to a grid error is present. FIG. 16 is a diagram illustrating a positional relationship between the first line-shaped pixel and the second line-shaped pixel. FIG. 16 illustrates several pixels among the plurality of first line-shaped pixels 141 disposed in the first pixel layer 140. In addition, FIG. 16 also illustrates the second line-shaped pixel 151 having the same X coordinate as the first line-shaped pixels 141. As illustrated in FIG. 16, when the point image QA is present, a deformed portion corresponding to the point image QA is detected at a position of $x=x_{1QA}$ in the first detection intensity profile and at a position of $x=x_{2QA}$ in the second detection intensity profile. The range of the point image QA detected as the same x coordinate in the first and second detection intensity profiles is illustrated in an area (R202) surrounded by a thick dashed dotted line. This area R202 indicates grid errors ($G_x$, $G_y$). $G_x$ is a length of a diagonal line of the area R202 having a rhombus shape in the X direction. $G_y$ is a length of a diagonal line of the area R202 in the Y direction. When the line pitch of the first line-shaped pixels 141 and the line pitch of the second line-shaped pixels 151 are the same ($=L_P$), the grid error can be calculated by the following Formulae (6a) and (6b).

$$G_x = L_P/\sin\theta_1 \quad \text{Formula (6a)}$$

$$G_y = L_P/\cos\theta_1 \quad \text{Formula (6b)}$$

Since $\theta_1$ is usually set in the vicinity of n/2, $G_y$ is larger than $G_x$. In order to reduce $G_y$, it is preferable that $\theta_1$ be as small as possible (in the direction of approaching 0 from n/2). When the minimum pattern size observable in the image capturing device illustrated in FIG. 1 is $L_{min}$, since $L_{min}<L_{GH}$ is usually satisfied, the case where Formula (5) is satisfied and $\theta_1$ is the minimum is $\theta_1=\tan^{-1}(H/L_{min})$. The resolution of the detector (the smallest unit that can be detected) is usually determined to be ½ to 1⁄10 of the minimum observable pattern size ($L_{min}$). The resolution of the image detector in the X direction is $G_x$, and when $L_{min}$ is 2 to 10 times $G_x$ and the relationship of $\theta_1=\tan^{-1}(H/L_{min})$ is used for organization, it is desirable that the angle ($\pi-2\theta_1$) formed by the first line-shaped pixel 141 and the second line-shaped pixel 151 be within a range satisfying the following Formula (7).

$$2\sin^{-1}(2L_p/H) <= \Pi - 2\theta_1 <= 2\sin^{-1}(10L_p/H) \quad \text{Formula (7)}$$

As described above, according to the image capturing device of the embodiment, the detection body 100 of the image detector 14 includes four pixel layers (first to fourth pixel layers 140, 150, 160, and 170). A plurality of line-shaped pixels (first to fourth line-shaped pixels 141, 151, 161, and 171) are disposed in each of the first to fourth pixel layers 140, 150, 160, and 170, and the line direction of the line-shaped pixels in each layer is different from each other. In the first detection intensity profile obtained by the first line-shaped pixel 141, the second detection intensity profile obtained by the second line-shaped pixel 151, the third detection intensity profile obtained by the third line-shaped pixel 161, and the fourth detection intensity profile obtained by the fourth line-shaped pixel 171, a set of deformed portions caused by the same small area image is determined. A small area image is reconstructed using a plurality of deformed portions associated with each other for each set. The reconstructed image of the entire detection area 181 is generated by superimposing all the obtained small area images.

Since the reconstruction is performed in an area smaller than the detection area 181, the reconstructed image can be acquired with high accuracy by using a small number of pixel layers without using many pixel layers having different angles $\theta_m$ formed by the line-shaped pixel and the X-axis (Y-axis). That is, the reconstructed image can be acquired with high accuracy while simplifying the manufacturing of the image detector. Further, in the acquisition of the detection intensity distribution, since it is not necessary to rotate the subject 41, the positional deviation of the subject 41 (deviation of the rotation axis) does not occur when the subject 41 is rotated, and thus the reconstructed image can be generated with higher accuracy.

The fourth line-shaped pixel 171 may be omitted. In this case, the line direction $\theta_3$ of the third line-shaped pixel 161 is $\pi/2$. Although the deformed portion of the third detection profile can only identify the Y coordinate, when the third line-shaped pixel 161 has a sparse pattern in which at least one small area image is present, the reconstructed image can be acquired with sufficient accuracy. In such a configuration, the number of layers of the pixel layer can be reduced to three, and thus the manufacturing of the image detector 14 is further facilitated, and the manufacturing cost can be reduced.

Figure 17:
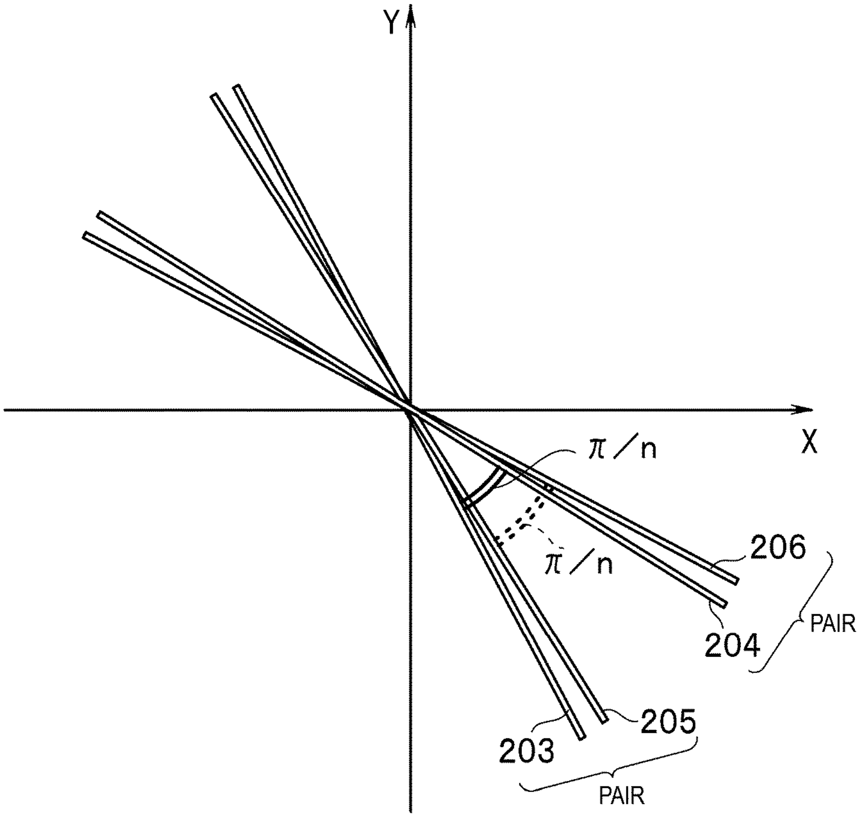
FIG. 17 is a diagram illustrating a disposition of line-shaped pixels.

In addition to the line-shaped pixels in the four directions described above, fifth, sixth, . . . , (2n−1)th, and 2n-th line-shaped pixels may be added (n is an integer of 3 or more). Here, the first and second line-shaped pixels 141 and 151 are referred to as a first pair, the third and fourth line-shaped pixels 161 and 171 are referred to as a second pair, the fifth and sixth line-shaped pixels are referred to as a third pair, . . . , and the (2n−1)th and 2n-th line-shaped pixels are referred to as an n-th pair. At this time, it is desirable that each pair be uniformly disposed in the rotation direction with the center of the detection area 181 as an axis when viewed from above in the Z direction. FIG. 17 is a view illustrating a disposition of line-shaped pixels. When i is an integer equal to or less than n, as illustrated in FIG. 17, it is desirable that the angle formed by the 2 (i−1)-th line-shaped pixel 203 and the 2i-th line-shaped pixel 204, and the angle formed by the (2i−1)th line-shaped pixel 205 and the (2i+1)th line-shaped pixel 206 be each n/n.

For example, when n=3, that is, two line-shaped pixels having different directions are added, and the first to sixth line-shaped pixels are disposed in the detection body 100, it is desirable to determine a line method of the six line-shaped pixels such that an angle formed by the first line-shaped pixel and the third line-shaped pixel, an angle formed by the second line-shaped pixel and the fourth line-shaped pixel, an angle formed by the third line-shaped pixel and the fifth line-shaped pixel, and an angle formed by the fourth line-shaped pixel and the sixth line-shaped pixel become $\pi/3=60$ degrees. By adding the line-shaped pixels in this manner, it is possible to acquire a more accurate reconstructed image.

Although the above embodiment assumes a transmission X-ray microscope, any device that acquires an image of the subject 41 may be used.

Second Embodiment

Next, a second embodiment will be described. The structure of the image capturing device of the second embodiment is the same as the structure of the first embodiment described above. The second embodiment is different from the first embodiment described above in that a method of reconstructing an image of the subject 41 (image generation method) from the first to fourth detection intensity profiles is different. The same elements as those in the first embodiment are denoted by the same reference numerals, and the description thereof will be omitted. Hereinafter, points different from the first embodiment will be described.

Figure 18A:
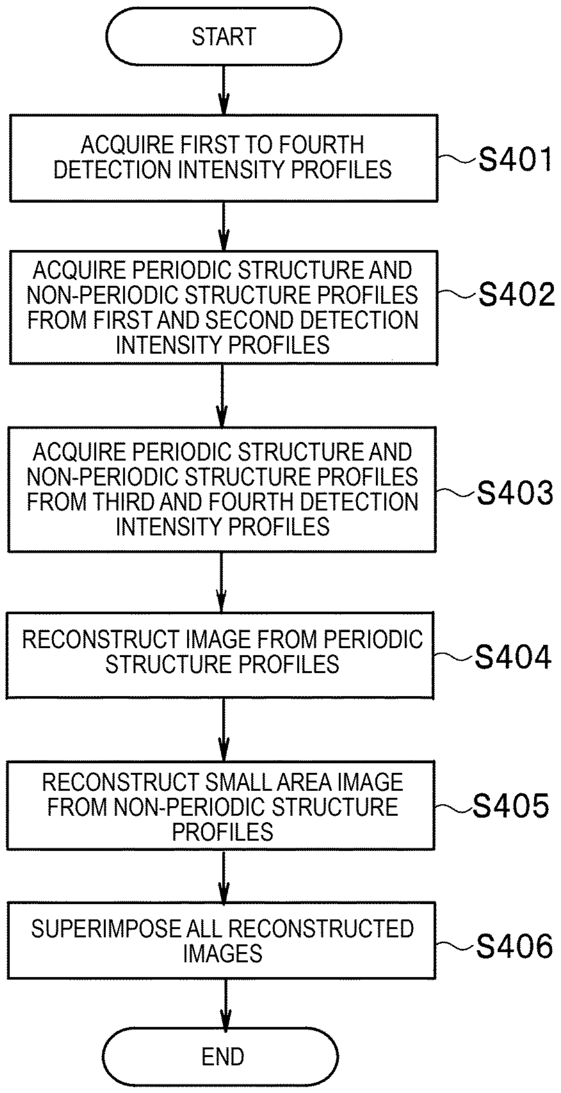
FIG. 18A is a flowchart illustrating an example of an image generation method according to a second embodiment.
Figure 19A:
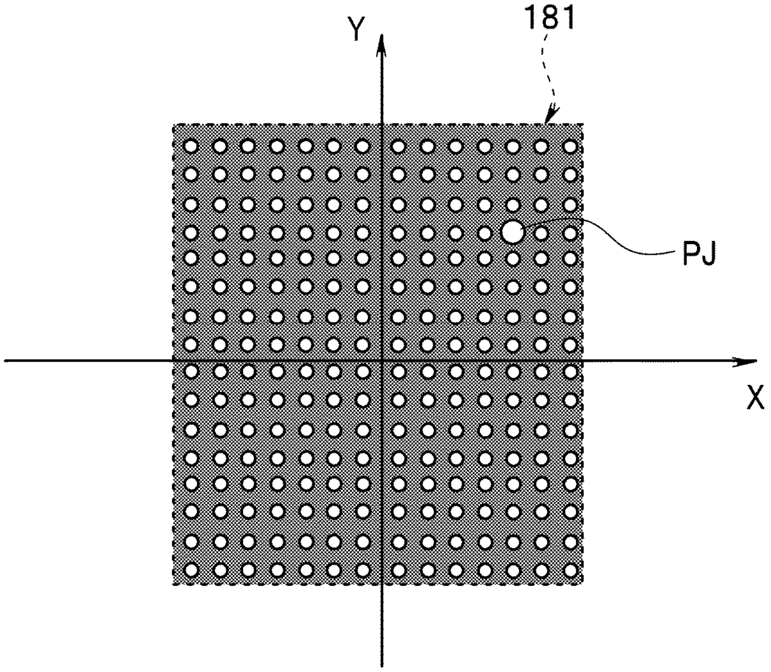
FIG. 19A is a diagram illustrating an example of an image formed on a detection body.

FIG. 18A is a flowchart illustrating an example of an image generation method according to the second embodiment. FIG. 19A is a diagram illustrating an example of an image formed on the detection body. As illustrated in FIG. 19A, a case where a small area image PJ is present is described below as an image formed on the detection body 100, in which a part of the image of the periodic structure pattern is deformed. First, the first detection intensity profile, the second detection intensity profile, the third detection intensity profile, and the fourth detection intensity profile are acquired (S401).

Figure 18B:
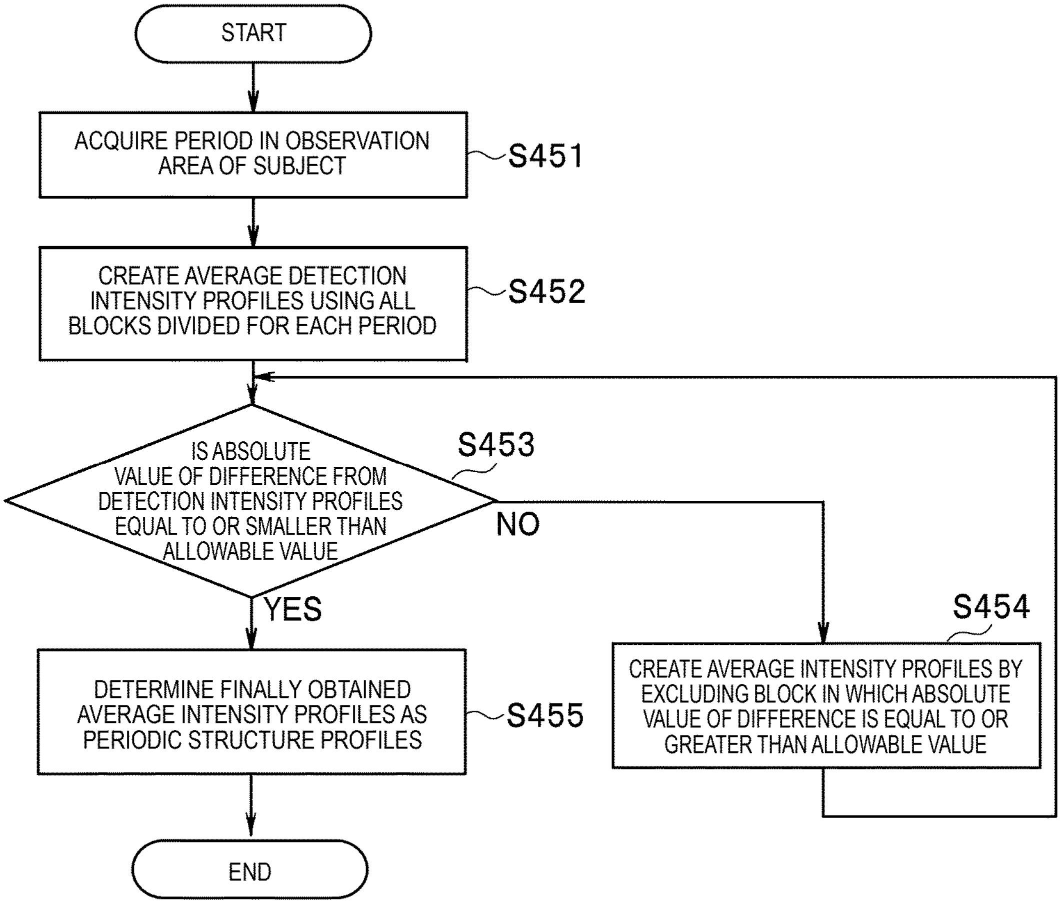
FIG. 18B is a flowchart illustrating an example of an extraction method of a periodic structure pattern.
Figure 19B:
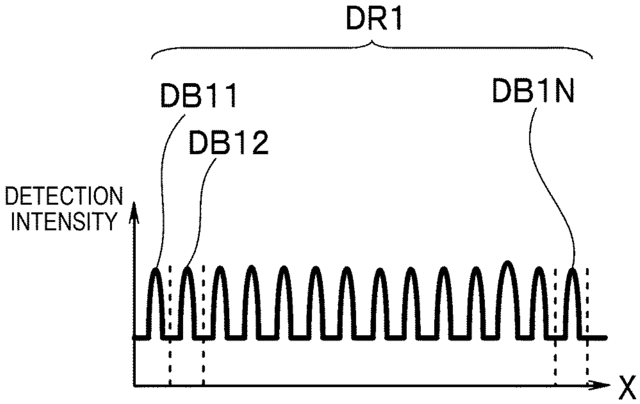
FIG. 19B is a diagram illustrating an example of a first detection intensity profile of the image illustrated in FIG. 19A.
Figure 19C:
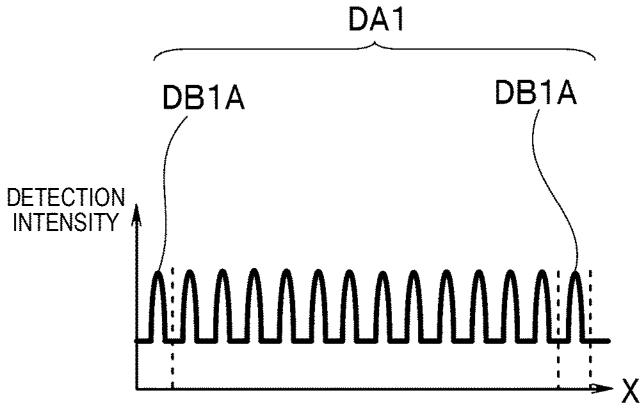
FIG. 19C is a diagram illustrating an example of a first average detection intensity profile of an image illustrated in FIG. 19A.
Figure 19D:
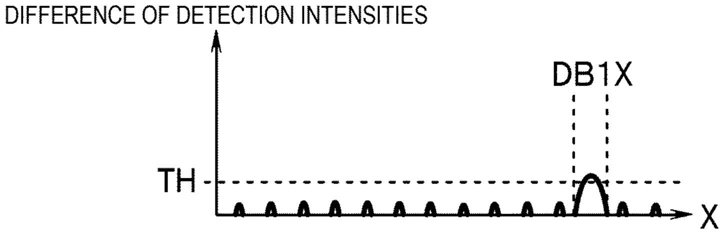
FIG. 19D is a diagram illustrating an absolute value of a difference of detection intensities with respect to an X coordinate.

FIG. 19B is a diagram illustrating an example of the first detection intensity profile of the image illustrated in FIG. 19A. Next, a detection intensity profile (periodic structure profile) in the first detection intensity profile and the second detection intensity profile and caused by the periodic structure pattern is extracted. FIG. 18B is a flowchart illustrating an example of an extraction method of the periodic structure A period TX in the X direction in the observation area of the subject 41 is acquired from the design data. Alternatively, the Fourier analysis of the first and second detection intensity profiles may be performed, and the period TX may be acquired based on a period corresponding to a Fourier component that is commonly present in the first and second detection intensity profiles and has the maximum intensity or the like (S451). The X coordinates of the first detection intensity profile (DR1) are divided into N blocks for each period TX, and the average profile (DB1A) of the detection intensity profiles (DB11, DB12, . . . , and DB1N) of each block is disposed in the X direction by N to create the first average detection intensity profile (DA1) (S452). FIG. 19C is a diagram illustrating an example of the first average detection intensity profile of the image illustrated in FIG. 19A. Subsequently, a difference between the first average detection intensity profile (DA1) and the first detection intensity profile (DR1) is obtained. FIG. 19D illustrates an absolute value of a difference in detection intensity with respect to the X coordinate. It is determined whether there is a difference of which the absolute value exceeds a predetermined allowable value (TH), and when YES is determined, the process proceeds to S455 (S453). When NO is determined, the block (DB1X) in which the absolute value of the difference exceeds the allowable value is excluded, the average profile of the detection intensity profiles of the remaining blocks is calculated, the obtained average profile is disposed in the X direction by N, and accordingly, the first average detection intensity profile is created, and the process returns to S453 (S454). The finally obtained first average detection intensity profile is determined as a first periodic structure profile (S455). Similarly, the second periodic structure profile is extracted from the second detection intensity profile, and when the total sum of the areas and the centroid positions of the deformed portions of the obtained second periodic structure profile match the total sum of the areas and the centroid positions of the deformed portions of the first periodic structure profile within the range of variation, then the both are regarded as periodic structure profiles caused by the same periodic structure pattern. Then, the first periodic structure profile is subtracted from the first detection intensity profile to acquire a first detection intensity profile (first non-periodic structure profile) based on the non-periodic structure pattern. In addition, the second non-periodic structure profile is acquired by subtracting the second periodic structure profile caused by the same periodic structure pattern as the first periodic structure profile from the second detection intensity profile (S402).

Figure 19E:
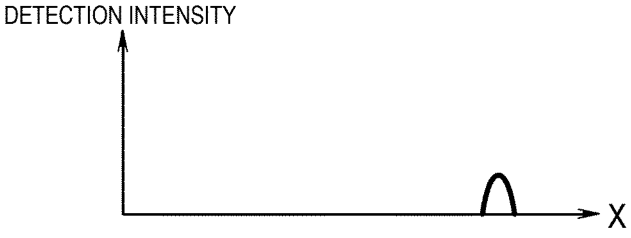
FIG. 19E is a diagram illustrating an example of a first detection intensity profile according to a non-periodic structure pattern.

FIG. 19E is a diagram illustrating an example of a first detection intensity profile according to a non-periodic structure pattern. According to the procedure of S402, as illustrated in FIG. 19E, a detection intensity profile in which only a deformed portion based on a non-periodic structure pattern present in the observation area of the subject 41 is extracted can be acquired.

Subsequently, in S402, by the procedure in which the first detection intensity profile, the first average detection intensity profile, and the first periodic structure profile are replaced with the third detection intensity profile, the third average detection intensity profile, and the third periodic structure profile, and the second detection intensity profile, the second average detection intensity profile, and the second periodic structure profile are replaced with the fourth detection intensity profile, the fourth average detection intensity profile, and the fourth periodic structure profile, the third detection intensity profile (third periodic structure profile) and the fourth detection intensity profile (fourth periodic structure profile), which are in the third detection intensity profile and the fourth detection intensity profile and caused by the periodic structure pattern, are extracted. When the total sum of the areas and the centroid position of the deformed portion of the obtained third or fourth periodic structure profile match the total sum of the areas and the centroid position of the deformed portion of the first or second periodic structure pattern within the range of variation, the third and fourth periodic structure profiles are regarded as being caused by the same periodic structure pattern as the first and second periodic structure profiles. The third detection intensity profile (third non-periodic structure profile) due to the non-periodic structure pattern is acquired by subtracting the third periodic structure profile, which is caused by the same periodic structure pattern as the first and second periodic structure patterns, from the third detection intensity profile, and the fourth detection intensity profile (fourth non-periodic structure profile) is acquired by subtracting the fourth periodic structure profile, which is caused by the same periodic structure pattern as the first and the second periodic structure patterns, from the fourth detection intensity profile (S403).

Next, the first to fourth periodic structure profiles caused by the same periodic structure pattern are used, and an image due to the periodic structure pattern is reconstructed by the FBP method or the like (S404). Further, the first to fourth non-periodic structure profiles are used to reconstruct the small area image by the non-periodic structure pattern (S405). The S405 is performed using a series of procedures illustrated in FIG. 9. The first to fourth detection intensity profiles in the procedure in FIG. 9 are executed by being respectively replaced with the first to fourth non-periodic structure profiles.

Finally, the image formed by the reconstructed periodic structure pattern in S404 and the reconstructed small area image in S405 are superimposed on each other. The superimposed image is output as an image formed on the detection body 100 (S406). With the above, a series of procedures related to the image generation method according to the second embodiment are completed.

When the subject 41 has a dense periodic structure pattern as illustrated in FIG. 4, the deformed portions are likely to be superimposed on each other in the first embodiment. As a result, it may be impossible to distinguish the deformed portion, and a reconstructed image different from an actual image may be output. In contrast, in the second embodiment, the detection intensity profile based on the sparse non-periodic structure pattern can be taken out since the detection intensity profile based on the periodic structure pattern is excluded. Therefore, even when the subject 41 has a dense periodic structure pattern, the reconstructed image can be acquired with high accuracy.

Third Embodiment

Next, a third embodiment will be described. The structure of the image capturing device of the third embodiment is the same as the structure of the second embodiment described above. The third embodiment is different from the second embodiment described above in that a method of reconstructing an image of the subject 41 (image generation method) from the first to fourth detection intensity profiles is different. The same elements as those in the second embodiment are denoted by the same reference numerals, and the description thereof will be omitted. Hereinafter, points different from the second embodiment will be described.

Figure 20:
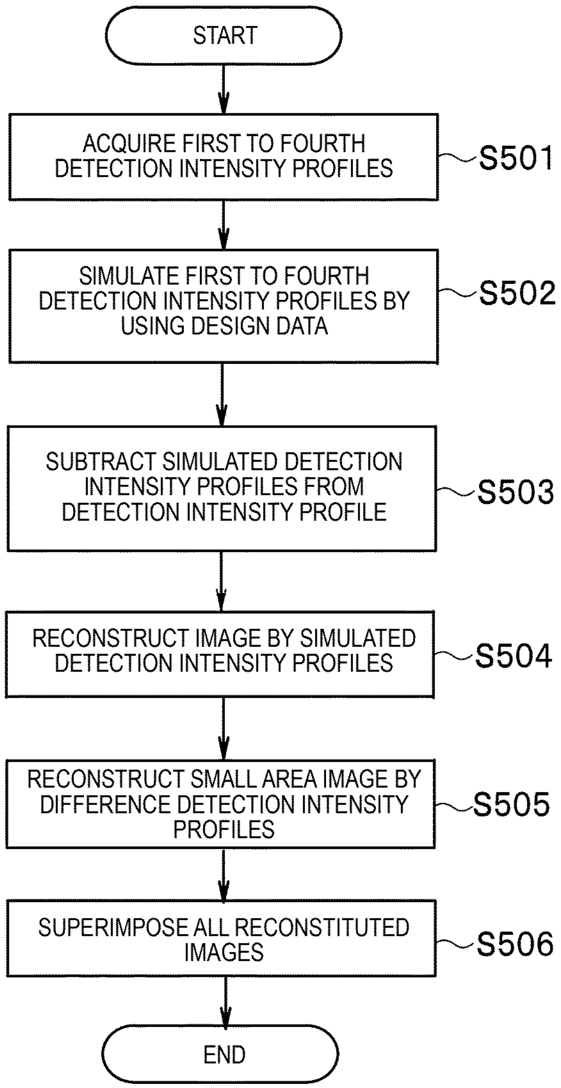
FIG. 20 is a flowchart illustrating an example of an image generation method according to a third embodiment.

FIG. 20 is a flowchart illustrating an example of an image generation method according to the third embodiment.

First, the first detection intensity profile, the second detection intensity profile, the third detection intensity profile, and the fourth detection intensity profile are acquired (S501). Next, an image formed on the detection body 100 is calculated by an image forming simulator or the like using design data of an observation area of the subject 41. Thereby, the first to fourth simulated detection intensity profiles corresponding to the first to fourth detection intensity profiles are created. (S502)

Following (S502), the first simulated detection intensity profile is subtracted from the first detection intensity profile, the second simulated detection intensity profile is subtracted from the second detection intensity profile, the third simulated detection intensity profile is subtracted from the third detection intensity profile, and the fourth simulated detection intensity profile is subtracted from the fourth detection intensity profile (S503). The profile generated by the S503 is referred to as first to fourth difference detection intensity profiles.

Next, an image based on the design data is reconstructed using the first to fourth simulated detection intensity profiles by the FBP method or the like (S504). When the image calculated by the simulation in S501 is used, S504 may be omitted.

Further, the first to fourth difference detection intensity profiles are used to reconstruct the small area image, which is a difference part from the design data (S505). The S505 is performed using a series of procedures illustrated in FIG. 9. The first to fourth detection intensity profiles in the procedure in FIG. 9 are executed by being respectively replaced with the first to fourth difference detection intensity profiles.

Finally, the image based on the reconstructed design data in S504 (or the image calculated by simulating based on the design data in S501) and the small area image, which is a difference part from the reconstructed design data in S505, are superimposed on each other. The superimposed image is output as an image formed on the detection body 100 (S506). With the above, a series of procedures related to the image generation method according to the third embodiment are completed.

According to the present embodiment, by subtracting the simulated detection intensity profile from the detection intensity profile, only the difference part between the actual image and the image predicted by the simulation is extracted. Accordingly, it is possible to reconstruct a sparse image with few superimposed deformed portions in the difference detection intensity profile. Therefore, a highly accurate reconstructed image can be acquired.

Fourth Embodiment

Figure 21:
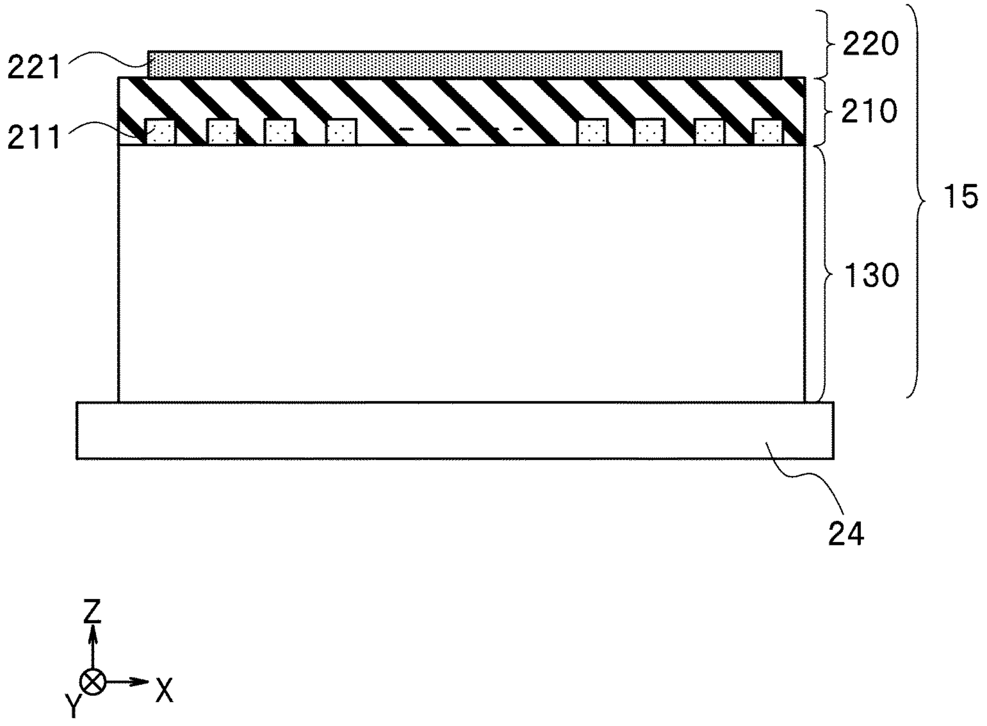
FIG. 21 is a view illustrating an example of a cross section of an image detector according to the fourth embodiment.
Figure 22:
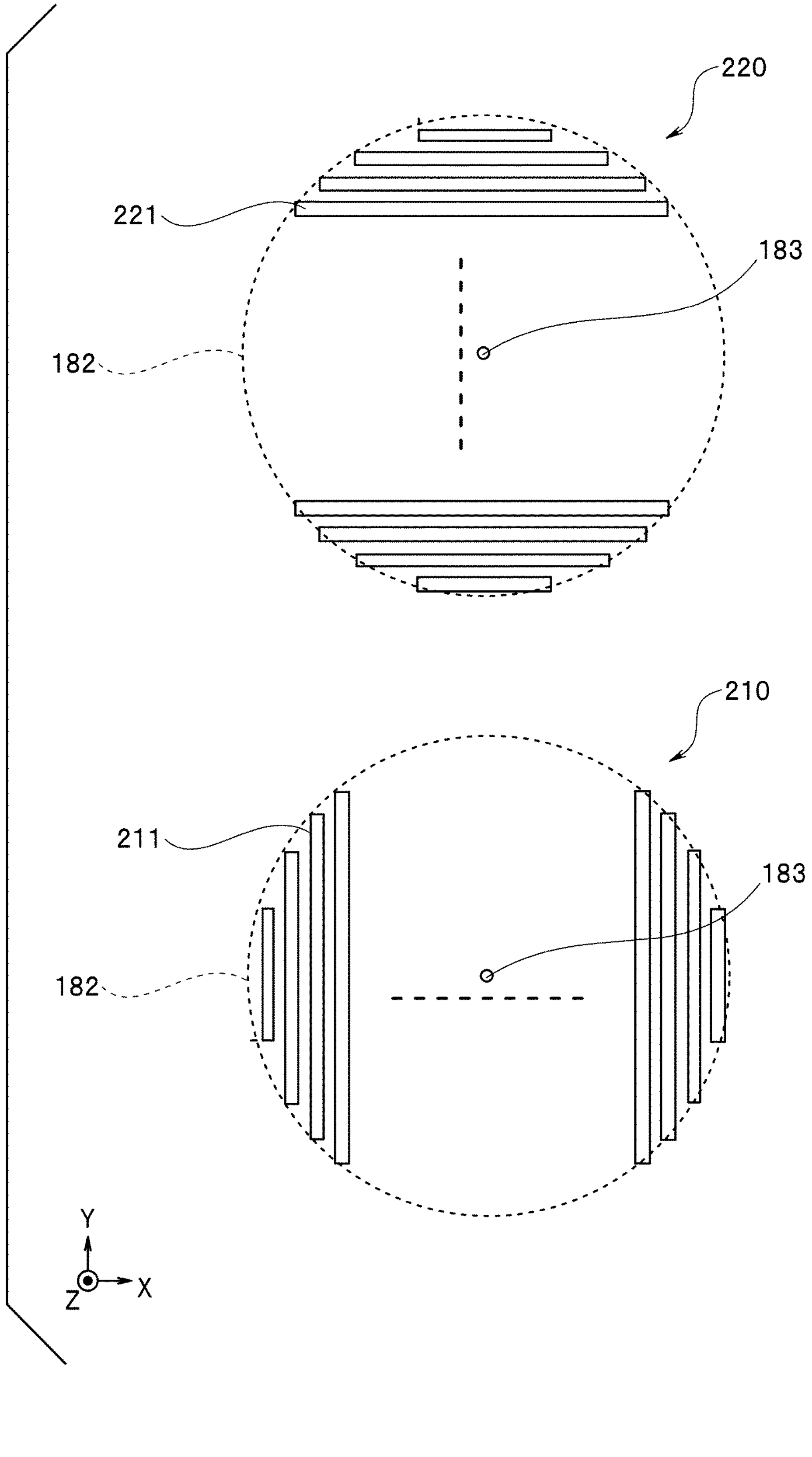
FIG. 22 is a plan view of a fifth pixel layer and a sixth pixel layer as viewed from above in the Z direction.

Next, a fourth embodiment will be described. The structure of the image detector of the first embodiment is configured with four layers of the first pixel layer, the second pixel layer, the third pixel layer, and the fourth pixel layer, but the structure in the present embodiment is configured with two layers of a fifth pixel layer 210 and a sixth pixel layer 220 as illustrated in FIG. 21. FIG. 21 is a view illustrating an example of a cross section of the image detector according to the fourth embodiment. FIG. 22 is a plan view of the fifth pixel layer and the sixth pixel layer as viewed from above in the Z direction. FIG. 22 illustrates the sixth pixel layer on the upper side and the fifth pixel layer on the lower side of FIG. 22. As illustrated on the lower side of FIG. 22, the fifth pixel layer 210 has fifth line-shaped pixels 211 extending in the Y direction and arranged at equal intervals in the X direction. Further, as illustrated on the upper side of FIG. 22, the sixth pixel layer 220 has sixth line-shaped pixels 221 extending in the X direction and arranged at equal intervals in the Y direction. A rotation mechanism 24 that rotates around a center 183 of the detection area 182 on an axis in the Z direction is provided. The detection area 181 of the image detector 14 of the first embodiment is rectangular, but the detection area 182 of the image detector 15 of the fourth embodiment is circular in order to detect the same image even when rotated. The same elements as those in the first embodiment are denoted by the same reference numerals, and the description thereof will be omitted. Hereinafter, points different from the first embodiment will be described.

Figure 23:
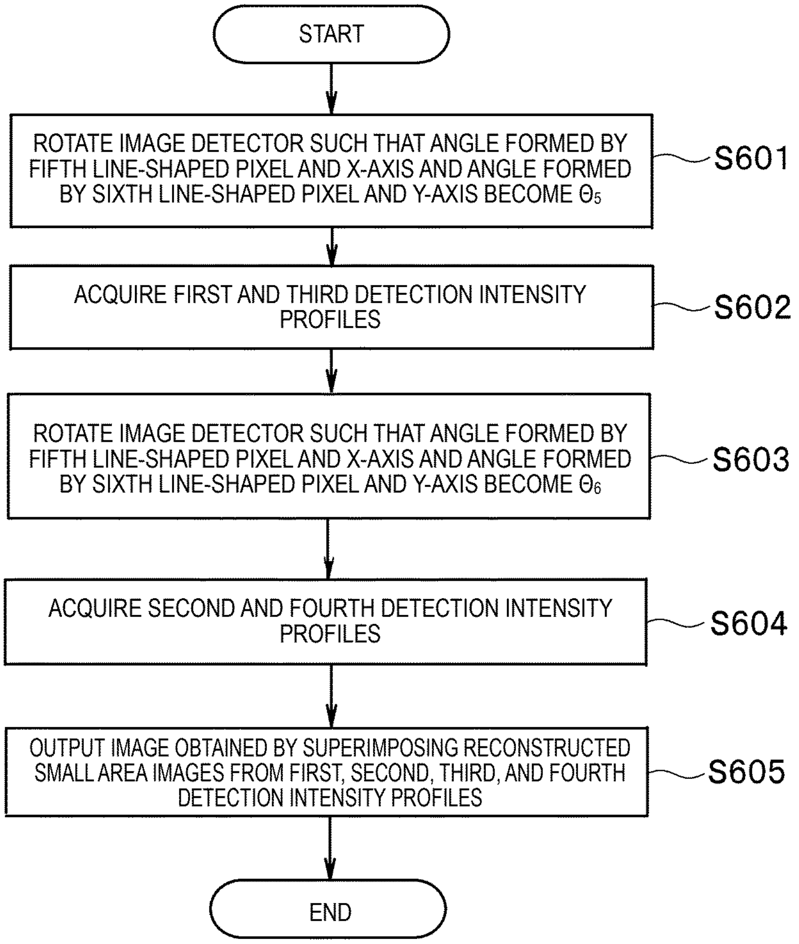
FIG. 23 is a flowchart illustrating an example of an image generation method according to a fourth embodiment.
Figure 24A:
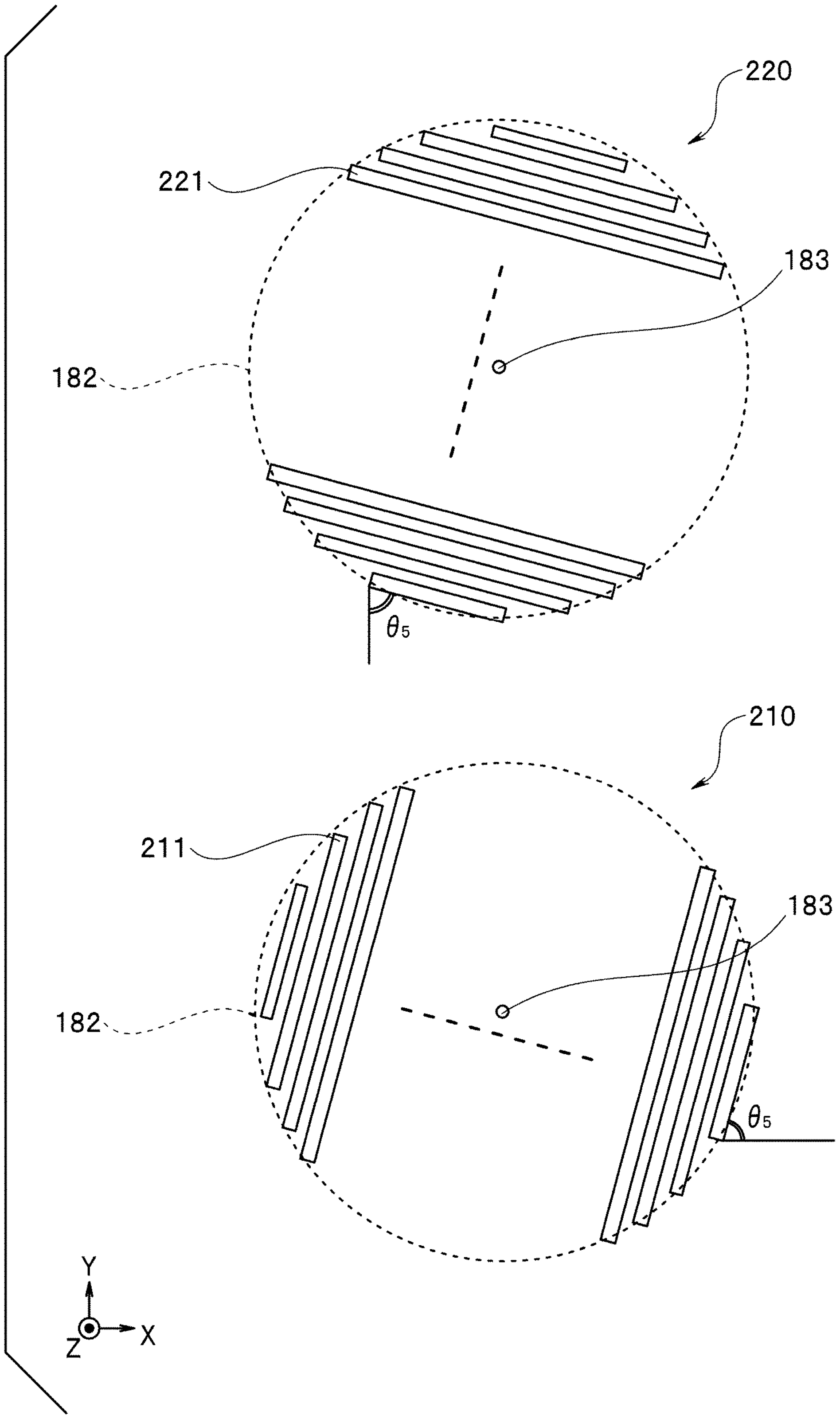
FIG. 24A is a plan view of the fifth pixel layer and the sixth pixel layer as viewed from above in the Z direction in a state where the image detector is rotated at a predetermined angle.
Figure 24B:
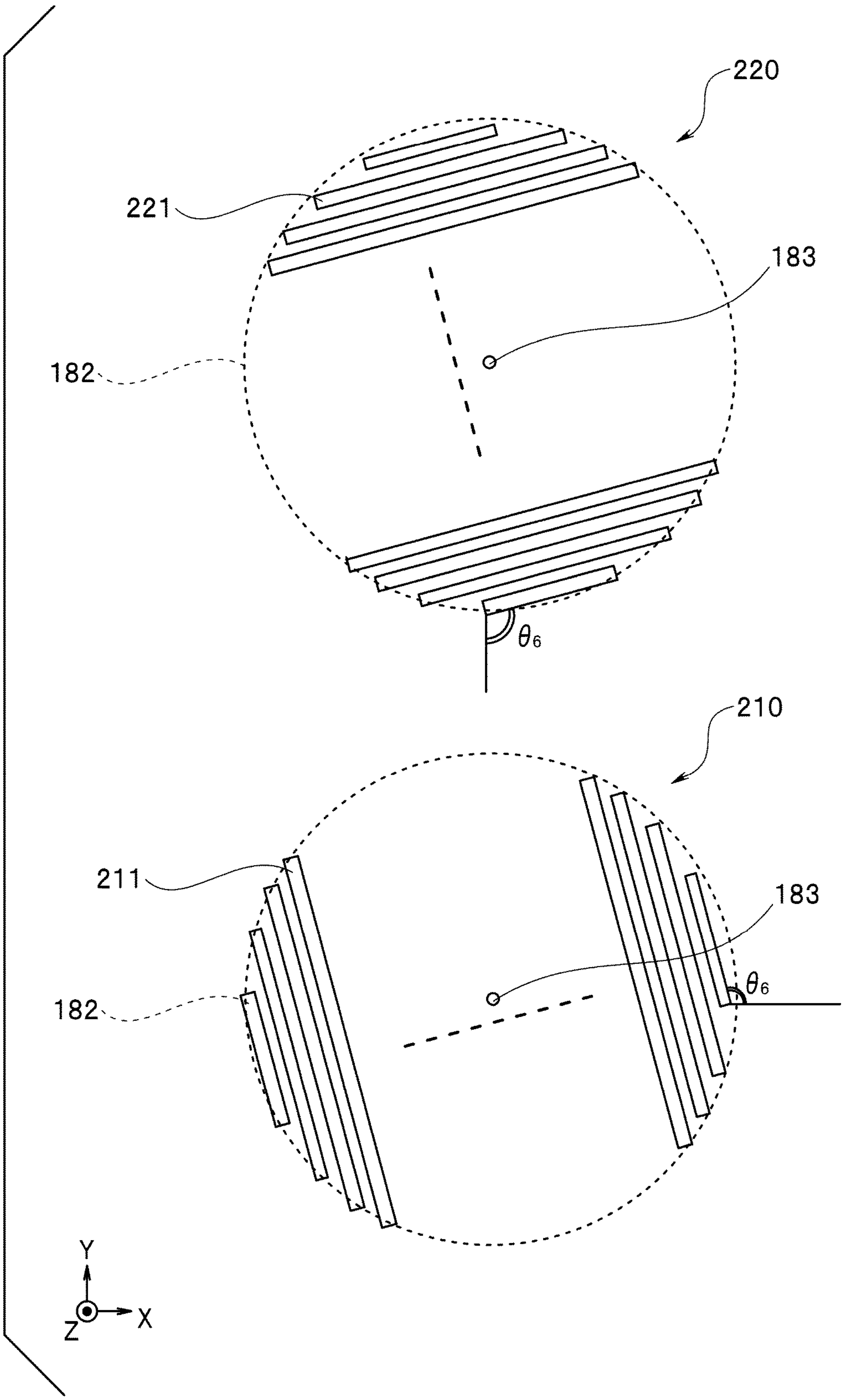
FIG. 24B is a plan view of the fifth pixel layer and the sixth pixel layer as viewed from above in the Z direction in a state where the image detector is rotated at a predetermined angle.

FIG. 23 is a flowchart illustrating an example of an image generation method according to the fourth embodiment. In addition, FIGS. 24A and 24B are plan views of the fifth pixel layer and the sixth pixel layer as viewed from above in the Z direction in a state where the image detector is rotated at a predetermined angle. First, as illustrated in FIG. 24A, the image detector 15 is rotated around the Z direction with 183 as a center by using the rotation mechanism 24 such that the angle formed by the fifth line-shaped pixel 211 and the X-axis and the angle formed by the sixth line-shaped pixel 221 and the Y-axis become $\theta_5$ (S601). In this state, the detection intensity profile is acquired from the fifth line-shaped pixel 211 and the sixth line-shaped pixel 221 (S602). At this time, the detection intensity profile obtained by the fifth line-shaped pixel 211 corresponds to the first detection intensity profile, and the detection intensity profile obtained by the sixth line-shaped pixel 221 corresponds to the third detection intensity profile. Next, the image detector 15 is rotated such that the angle formed by the fifth line-shaped pixel 211 and the X-axis and the angle formed by the sixth line-shaped pixel 221 and the Y-axis become $\theta_6$ as illustrated in FIG. 24B (S603). In this state, the detection intensity profile is acquired from the fifth line-shaped pixel 211 and the sixth line-shaped pixel 221 (S604). At this time, the detection intensity profile obtained by the fifth line-shaped pixel 211 corresponds to the second detection intensity profile, and the detection intensity profile obtained by the sixth line-shaped pixel 221 corresponds to the fourth detection intensity profile. An image in which all the small area images reconstructed in the same manner as in the first embodiment are superimposed is output by using the detection intensity profiles corresponding to the obtained first, second, third, and fourth detection intensity profiles (S605). With the above, a series of procedures related to the image generation method according to the fourth embodiment are completed. It should be noted that, in the above description, the detection intensity profiles corresponding to the first, second, third, and fourth detection intensity profiles are acquired by rotating the image detector 15, but the image detector 15 may be replaced by rotating the subject 41 about the D3 direction with a position corresponding to the center of the detection area 182 as a center.

According to the present embodiment, by rotating an image detector including two layers of pixel layers, it is possible to reduce the number of layers of the image detector, and it is possible to simplify the manufacturing of the image detector. In addition, since the rotation angle is small, it is possible to reduce the positional deviation due to the rotation.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image capturing device comprising:

a stage holding a subject;

a detector including a first pixel layer, a second pixel layer, and a third pixel layer stacked on top of one another, with an insulating film interposed adjacent ones of the first to third pixel layers;

an image formation optical member configured to form, on the detector, an image of the subject; and an image processor configured to reconstruct an image of the subject based on a detection intensity of the imaging light detected by the detector, wherein the first pixel layer includes a plurality of first line-shaped pixels with line-shaped light receiving surfaces extending in a first direction, and the plurality of first line-shaped pixels are arranged with equal intervals in a plane parallel to the first pixel layer, the second pixel layer includes a plurality of second line-shaped pixels with line-shaped light receiving surfaces extending in a second direction, and the plurality of second line-shaped pixels are arranged with equal intervals in a plane parallel to the second pixel layer, the third pixel layer includes a plurality of third line-shaped pixels with line-shaped light receiving surfaces extending in a third direction, and the plurality of third line-shaped pixels are arranged with equal intervals in a plane parallel to the third pixel layer, the first direction, the second direction, and the third direction are different from one another, the detector is configured to output a first detection intensity profile detected by the first pixel layer, a second detection intensity profile detected by the second pixel layer, and a third detection intensity profile detected by the third pixel layer, and the image processor is further configured to:

extract one or more first deformed portions from the first detection intensity profile, extract one or more second deformed portions from the second detection intensity profile, and extract one or more third deformed portions from the third detection intensity profile;

create one or more deformed portion sets including at least one of the first deformed portions, at least one of the second deformed portions, and at least one of the third deformed portions;

reconstruct a small area image based on the first to third deformed portions in each of the deformed portion sets; and generate the image of the subject by superimposing the reconstructed small area images.

2. The image capturing device according to claim 1, wherein the detector further includes a fourth pixel layer, and is configured to output a fourth detection intensity profile detected by the fourth pixel layer, the fourth pixel layer includes a plurality of fourth line-shaped pixels with line-shaped light receiving surfaces extending in a fourth direction, and the plurality of fourth line-shaped pixels are arranged with equal intervals in a plane parallel to the fourth pixel layer, the fourth direction is a direction different from any of the first direction, the second direction, and the third direction, and the image processor is configured to:

extract one or more fourth deformed portions from the fourth detection intensity profile;

generate one or more first deformed portion pairs including one of the first deformed portions and one of the second deformed portions, and generate one or more second deformed portion pairs including one of the third deformed portions and one of the fourth deformed portions;

calculate first centroid coordinates of a first small area image for each of the first deformed portion pairs;

calculate second centroid coordinates of a second small area image for each of the second deformed portion pairs; and create the deformed portion set by the first deformed portion, the second deformed portion, the third deformed portion, and the fourth deformed portion, wherein the first centroid coordinates and the second centroid coordinates are substantially equal.

3. The image capturing device according to claim 2, wherein a first included angle formed by the first direction and the second direction and a second included angle formed by the third direction and the fourth direction are equal to each other.

4. The image capturing device according to claim 2, wherein the image processor is further configured to:

extract a first periodic structure profile common to the first detection intensity profile and the second detection intensity profile;

generate a first difference profile and a second difference profile by subtracting the first periodic structure profile from the first detection intensity profile and the second detection intensity profile;

extract a second periodic structure profile common to the third detection intensity profile and the fourth detection intensity profile;

generate a third difference profile and a fourth difference profile by subtracting the second periodic structure profile from the third detection intensity profile and the fourth detection intensity profile;

reconstruct the small area image by using the first to fourth difference profiles;

reconstruct a periodic image by using the first periodic structure profile and the second periodic structure profile; and generate the image of the subject by superimposing all the reconstructed small area images and the periodic image on each other.

5. An image generation method comprising:

generating a first detection intensity profile indicating an intensity of imaging light transmitted through a subject detected in a first pixel layer, a second detection intensity profile indicating an intensity of image of the subject detected in a second pixel layer, and a third detection intensity profile indicating an intensity of the image of the subject detected in a third pixel layer, wherein the first pixel layer, the second pixel layer, and the third pixel layer are stacked on top of one another with an insulating film interposed between adjacent one of the first to third pixel layers, and wherein a plurality of first line-shaped pixels with line-shaped light receiving surfaces extending in a first direction are arranged with equal intervals in a plane parallel to the first pixel layer in the first pixel layer, a plurality of second line-shaped pixels with line-shaped light receiving surfaces extending in a second direction are arranged with equal intervals in a plane parallel to the second pixel layer in the second pixel layer, and a plurality of third line-shaped pixels with line-shaped light receiving surfaces extending in a third direction are arranged with equal intervals in a plane parallel to the third pixel layer in the third pixel layer, extracting one or more first deformed portions from the first detection intensity profile, extracting one or more second deformed portions from the second detection intensity profile, and extracting one or more third deformed portions from the third detection intensity profile;

creating one or more deformed portion sets including at least one of the first deformed portions, at least one of the second deformed portions, and at least one of the third deformed portions;

reconstructing a small area image based on the first to third deformed portions in each of the deformed portion sets; and generating an image of the subject by superimposing the reconstructed small area images.

6. An image capturing device that detects any image, wherein a line-shaped pixel array disposed in a detection area is provided, line directions of the line-shaped pixel array are at least three directions including a first line direction, a second line direction, and a third line direction, a first equal division direction is disposed between the first line direction and the second line direction, the first equal division direction being one of directions that equally divide, by straight lines with the number equal to or less than the number of the line directions minus 1 and equal to or more than 2 and passing through a center of the detection area, a rotation direction about the center as an axis, and an angle of the third line direction with respect to a second equal division direction different from the first equal division direction is equal to or less than an angle formed by the first equal division direction and the first line direction, a function of acquiring a first detection intensity profile by the line-shaped pixel array in the first line direction, a second detection intensity profile by the line-shaped pixel array in the second line direction, and a third detection intensity profile by the line-shaped pixel array in the third line direction, is provided, a function of extracting a first deformed portion present at a part of the first detection intensity profile, extracting a second deformed portion of the second detection intensity profile and a third deformed portion of the third detection intensity profile by a small area image in the detection area corresponding to the first deformed portion of the first detection intensity profile, and reconstructing the small area image from a combination of the first deformed portion of the first detection intensity profile, the second deformed portion of the second detection intensity profile, and the third deformed portion of the third detection intensity profile, is provided, and a mechanism that outputs an image obtained by superimposing all the reconstructed small area images on each other is provided.

7. The image capturing device according to claim 6, wherein an angle formed by the first line direction and the second line direction is twice or more an inverse sine of a value obtained by dividing twice a line pitch of a line-shaped pixel by a width of the detection area in a direction of an angle that is half of the angle formed by the first line direction and the second line direction, and is twice or less an inverse sine of a value obtained by dividing ten times the line pitch of the line-shaped pixel by a width of the detection area in a direction of a straight line in the direction of the angle that is half of the formed angle by the first line direction and the second line direction.

8. The image capturing device according to claim 6, wherein a function of acquiring a fourth detection intensity profile by the line-shaped pixel array in a fourth line direction, which is a direction different from the first line direction, the second line direction, and the third line direction, is provided, and a function of extracting the first deformed portion present at a part of the first detection intensity profile, extracting the second deformed portion of the second detection intensity profile, the third deformed portion of the third detection intensity profile, and a fourth deformed portion of the fourth detection intensity profile from the small area image in the detection area corresponding to the first deformed portion of the first detection intensity profile, and reconstructing the small area image from a combination of the first deformed portion of the first detection intensity profile, the second deformed portion of the second detection intensity profile, the third deformed portion of the third detection intensity profile, and the fourth deformed portion of the fourth detection intensity profile, is provided.

9. The image capturing device according to claim 6, wherein a function of extracting a periodic structure common to the first detection intensity profile and the second detection intensity profile, subtracting the periodic structure from the first detection intensity profile and the second detection intensity profile, reconstructing the small area image by using the first and second detection intensity profiles from which the periodic structure is subtracted, and outputting an image obtained by superimposing a reconstructed image of the periodic structure, is provided.

* * * * *